(12) United States Patent
Noji

(10) Patent No.: US 7,755,666 B2
(45) Date of Patent: Jul. 13, 2010

(54) ACTUATOR, AND LENS UNIT AND CAMERA WITH THE SAME

(75) Inventor: Takayoshi Noji, Saitama (JP)

(73) Assignee: Tamron Co., Ltd., Saitama (JP)

( * ) Notice: Subject to any disclaimer, the term of this patent is extended or adjusted under 35 U.S.C. 154(b) by 1299 days.

(21) Appl. No.: 11/254,095

(22) Filed: Oct. 20, 2005

(65) Prior Publication Data
US 2006/0082674 A1    Apr. 20, 2006

(30) Foreign Application Priority Data
Oct. 20, 2004    (JP) ............................. 2004-305281

(51) Int. Cl.
H04N 5/228    (2006.01)
G03B 17/00    (2006.01)

(52) U.S. Cl. ............................. 348/208.11; 348/208.99; 396/55

(58) Field of Classification Search ............ 348/208.11, 348/208.99, 208.1, 208.2, 208.4, 208.5, 208.7, 348/360
See application file for complete search history.

(56) References Cited

U.S. PATENT DOCUMENTS

| | | | | |
|---|---|---|---|---|
| 4,936,655 A | | 6/1990 | Leib et al. | |
| 5,416,558 A | * | 5/1995 | Katayama et al. | 396/52 |
| 5,606,384 A | * | 2/1997 | Yamazaki et al. | 396/55 |
| 6,154,611 A | | 11/2000 | Washisu et al. | |
| 6,400,902 B1 | | 6/2002 | Usui | |
| 6,631,042 B2 | * | 10/2003 | Noguchi | 396/55 |
| 6,718,131 B2 | * | 4/2004 | Okazaki et al. | 396/55 |
| 6,819,503 B2 | * | 11/2004 | Katagishi et al. | 396/55 |
| 2004/0022530 A1 | | 2/2004 | Okazaki et al. | |
| 2004/0057710 A1 | | 3/2004 | Terao | |

FOREIGN PATENT DOCUMENTS

| | | |
|---|---|---|
| JP | 11160721 A | 6/1999 |
| JP | 11-316399 | 11/1999 |

* cited by examiner

*Primary Examiner*—Luong T Nguyen
(74) *Attorney, Agent, or Firm*—Jacobson Holman PLLC

(57) ABSTRACT

An actuator that has a simple mechanism capable of locking a movable member, and a lens unit and a camera with the same. The actuator (10) includes a fixed member (12), a movable member (14) having a locking element (14*a*), a movable member supporting means (18) for supporting the movable member so as to permit the movable member to move to an arbitrary position in a plane in parallel with the fixed member, a drive mechanism (20*a*, 20*b*, 20*c*, 22) translating and rotating the movable member relative to the fixed member, and an engagement member (15) engaged with the locking element to lock the movable member when the movable member has been rotated to a predetermined position.

7 Claims, 12 Drawing Sheets

ACTUATOR, AND LENS UNIT AND CAMERA WITH THE SAME

TECHNICAL FIELD

This application claims priority from Japanese Patent application number 2004-305281, filed on Oct. 20, 2004, which are incorporated herein.

The present invention relates to an actuator, and a lens unit and a camera with the same, and more particularly, to an actuator that has a locking mechanism capable of locking a movable member, and a lens unit and a camera with the same.

BACKGROUND ART

Japanese Patent Preliminary Publication No. H11-316399 (referred to as Patent Document 1 listed below) discloses an image shaking correction device that is useful to compensate for image shaking. The correction device detects vibrations of a lens barrel and analyzes the detected vibration to actuate the correcting lens in a plane in parallel with the film so as not to cause image shaking. In order to translate the correcting lens in a desired direction, the correction device employs a holder frame securely holding a correction lens and a drive means to move the holder frame in two directions orthogonal to each other. Synthesizing the two orthogonal directions of motions allows for the correction lens to translate relative to the lens barrel in the desired direction in the plane in parallel with the film.

Additionally, the correction device has an engagement means to anchor the holder frame while the compensation operation for anti-shaking is not necessary. With such an engagement means, a lock ring, which is formed to fit on the holder frame, is actuated by stepping motor to fit the lock ring on the holder frame and lock the holder frame.

REFERENCE

Patent Document 1:
Japanese Patent Preliminary Publication No. H11-316399

DISCLOSURE OF THE INVENTION

Problem to be Solved by the Invention

As has been mentioned above, however, the locking mechanism that actuates a separate lock ring to lock the holder frame carrying the correction lens inadvertently leads to a complicated architecture of the whole correction device. The locking mechanism anchoring the holder frame with the lock ring actuated separately is disadvantageous in that it needs an additional element of a drive means for actuating the lock ring.

Accordingly, it is an object of the present invention to provide an actuator which has a lock mechanism for a movable member and is still simple in configuration, and a lens unit and a camera with the same.

Means for Solving Problem

To overcome the aforementioned disadvantages, the actuator according to the present invention is comprised of a fixed member, a movable member having a locking element, a movable member supporting means for supporting the movable member so as to permit the movable member to move to an arbitrary position in a plane in parallel with the fixed member, a drive means for translating and rotating the movable member relative to the fixed member, and an engagement member engaged with the locking element to lock the movable member when the movable member has been rotated to a predetermined position.

In the present invention thus configured, the drive means moves the movable member supported in parallel with the fixed member by the movable member supporting means. The drive means translates and rotates the movable member in a plane in parallel with the fixed member. When the movable member is rotated to a predetermined position, the locking element and the engagement member are engaged with each other to lock the movable member.

With such a configuration, since the movable member itself rotates and engages with the engagement member to lock itself, there is no need of an additional actuator to drive an element to clutch the movable member, and such a simple mechanism enables the locking of the movable member.

Also, the present invention preferably further comprises a retaining means for retaining the movable member, and wherein when the movable member is rotated and passes the predetermined position, the retaining means apply rotating force that rotates the movable member in a predetermined direction, thereby the locking element engages with the engagement member to maintain locked condition of the movable member.

With such a configuration according to the present invention, the movable member, upon rotating beyond the predetermined position, is urged to rotate in the predetermined direction by the retaining means to engage the locking element of the movable member with the engagement member.

Thus configured, the movable member can be retained without any action by the drive means.

Also, preferably, the drive means includes at least three actuating coils attached to either one of the fixed member and the movable member, actuating magnets attached to the remaining one of the fixed member and the movable member in positions corresponding to the actuating coils, a position sensing means for detecting relative positions of the actuating magnets to the actuating coils, and a control means for producing a coil position command signal related to the actuating coils on the basis of a command signal to instruct the position where the movable member is to be moved, and for controlling drive current to flow in the actuating coils in response to the coil position command signal and the position data detected by the position sensing means.

With such a configuration according to the present invention, when the current flows in each actuating coil, magnetic field is developed to cause magnetic force to apply from the actuating magnet to the corresponding one of the actuating coil. This works as a driving force to let the movable member move relative to the fixed member. The current position of the actuating magnet relative to the actuating coil is detected by the position sensing means. The control means, upon receiving the position data detected by the position sensing means and the coil position command signal, control the drive current to flow in the actuating coil to move the movable member to the desired position.

Thus configured, appropriately applying the coil position command signal enables the movable member to translate and rotate.

Also, in this invention, preferably, the movable member is shaped approximately in a disk, the locking element is formed with at least three engagement projections extending outwardly in radial directions, and the engagement member is annular in shape, surrounding the outer circumferential surface of the movable member, and is provided with engagement projection contacts protruding inwardly in the radial directions on which the engagement projections fit when the movable member is rotated to the predetermined position.

With such a configuration according to the present invention, when the movable member is rotated to the predetermined position, the engagement projections radially extend out of the movable member and the engagement projection contacts of the engagement member come in contact at least at three points.

Configured in this way, the movable member can be assuredly locked in locked condition.

Also, in this invention, preferably, the retaining means is comprised of a movable holder magnet attached to the movable member, and a fixed holder magnet positioned so as to apply magnetic force urging the movable holder magnet toward predetermined directions when the movable member is rotated to the predetermined position, and when the movable holder magnet and the fixed holder magnet are apart, they do not substantially affect each other, and as the rotation of the movable member brings the movable holder magnet closer to the fixed holder magnet, the magnetic force between them urges the movable member to rotate back, and when the movable member passes a position in which the movable holder magnet is closest to the fixed holder magnet, the magnetic force between them promotes the rotation of the movable member, thereby engaging the locking element with the engagement member.

With such a configuration of the present invention, as the movable member is rotated, magnetic force acts between the movable holder magnet and the fixed holder magnet, and when the movable member passes the position in which the movable holder magnet is closest to the fixed holder magnet, the repelling force between them works to engage the locking element with the engagement member.

Thus configured, since the repelling force between the movable and fixed holder magnets is used for the locking of the locking element with the engagement member, the engagement can be maintained without the driving force by the drive means.

Also, present invention, preferably, further comprises a manual release mechanism, and wherein the manual release mechanism manually rotates the movable member to engage the locking element with the engagement member or to release the engagement of them.

With such a configuration according to the present invention, the manual lock release mechanism enables the movable member to rotate with hand, and hence, even when the drive means does not work due to some trouble such as out-of-battery, the movable member can be manually locked and released.

Additionally, the lens unit according to the present invention is comprised of a lens barrel, a photographing lens housed in the lens barrel, a fixed member secured to the lens barrel, a movable member carrying an image stabilizing lens and having a locking element, a movable member supporting means for supporting the movable member so as to permit the movable member to move to an arbitrary position in a plane in parallel with the fixed member, a drive means for translating and rotating the movable member relative to the fixed member, an engagement member engaged with the locking element to lock the movable member when the movable member has been rotated to a predetermined position, a vibration sensing means for detecting vibrations of the lens barrel, and a control means for controlling the drive means to move the movable member in order to stabilize an image on the basis of a detection signal from the vibration sensing means, and then, in response to a locking command signal, controlling the drive means to move the movable member to the position where the movable member is locked.

Furthermore, a camera according to the present invention has the lens unit of the present invention.

EFFECTS OF THE INVENTION

Thus, in accordance with the present invention, provided are an actuator that has a simple mechanism to enable its movable member to be locked, and a lens unit and a camera having the same.

BEST MODE OF THE INVENTION

With reference to the accompanying drawings, preferred embodiments of the present invention will be described.

First, referring to FIGS. 1 to 12, the embodiment of a camera according to the present invention will be detailed. FIG. 1 is a sectional view showing the embodiment of the camera according to the present invention.

As can be seen in FIG. 1, the embodiment of the camera according to the present invention denoted by reference numeral 1 comprises a lens unit 2 and a camera body 4. The lens unit 2 includes a lens barrel 6, a plurality of photographing lenses 8 housed in the lens barrel 6, an actuator 10 moving an image stabilizing lens 16 in a predetermined plane, and gyros 34a, 34b respectively serving as vibration sensing means to detect vibrations of the lens barrel 6 (the gyro 34a alone is shown in FIG. 1). The camera 1 uses the gyros 34a, 34b to detect the vibrations, and in response to the detection results, the actuator 10 works to move the image stabilizing lens 16 to obtain a stabilized image focused in a film plane F within the camera body 4. In this embodiment, a piezoelectric vibration gyro is used for the gyros 34a, 34b, respectively. Also, in this embodiment, the image stabilizing lens 16 is made of a piece of lens, and alternatively, it may be of a group of more than one lenses. Hereinafter, the term of the "image stabilizing lens" covers a piece of lens and a group of lenses used to stabilize an image.

Next, referring to FIGS. 2 to 4, the actuator 10 will be described in detail. FIG. 2 is a frontal view of the actuator 10, FIG. 3 is a cross-sectional view taken along the line A-A in FIG. 2, and FIG. 4 is a frontal view showing a movable frame removed from the actuator. As can be seen in FIG. 2 to FIG. 4, the actuator 10 has a fixed plate 12 or a fixed member secured inside the lens barrel 6, a movable frame 14 or a movable member movably supported relative to the fixed plate 12, and an annular member 15 or an engagement member surrounding the movable frame 14 and engaged with the movable frame 14. The movable frame 14 is supported by three steel balls 18 or a movable member supporting means.

The actuator 10 further has three actuating coils 20a, 20b, 20c attached to the fixed plate 12, three actuating magnets 22 attached to the movable frame 14 in corresponding positions to the actuating coils 20a, 20b, 20c, respectively, and magnetic sensors 24a, 24b, 24c, namely, position sensing means disposed inside the actuating coils 20a, 20b, 20c, respectively. The actuator 10 is also provided with attracting yokes 26 mounted on the fixed plate 12 to let the magnetic force of the actuating magnets 22 attract the movable frame 14 onto the fixed plate 12, and provided with a back yoke 28 mounted on a reverse side of each of the actuating magnets 22 to effectively direct the magnetic force of the actuating magnets toward the fixed plate 12. The actuator 10 additionally includes an attracting magnet 30 pulling the steel balls 18 onto the movable frame 14 and steel ball contacts 32 mounted on both the fixed plate 12 and the movable frame 14 so as to smoothly roll the steel balls 18 between the fixed plate 12 and the movable frame 14. The actuating coils 20a, 20b, 20c and the actuating magnets 22 disposed in the corresponding positions to them together compose a drive means that enables the movable frame 14 to translate and rotate relative to the fixed plate 12.

The actuator 10 includes a manual locking element 52 extending radially inward from the outside of the annular member 15 and movable in circumferential directions, and an engagement pin 54 residing in the outer circumference of the movable frame 14 so as to engage with the manual locking element 52. The manual locking element 52 and the engagement pin 54 together constitute a manual locking/release mechanism that permits the movable frame 14 and the annular member 15 to be manually engaged with each other or to be released from each other.

Moreover, as shown in FIG. 1, the actuator 10 has a control means or a controller 36 controlling current to flow in the actuating coils 20a, 20b, 20c, respectively on the basis of vibrations detected by the gyros 34a, 34b and the position data of the movable frame 14 sensed by the magnetic sensors 24a, 24b, 24c.

The lens unit 2 is attached to the camera body 4 in order to focus incident light beams and form an image on the film plane F.

The lens barrel 6 shaped approximately in a cylinder holds a plurality of photographing lens 8 inside and allows for part of the photographing lens 8 to move, thereby adjusting a focus.

The actuator 10 causes the movable frame 14 to move in a plane in parallel with the film plane F relative to the fixed plate 12 secured to the lens barrel 6, and this, in turn, causes the image stabilizing lens 16 on the movable frame 14 to move, so as to avoid shaking of the image formed on the film plane F even when the lens barrel 6 is vibrated.

The fixed plate 12 is shaped approximately in a doughnut with three of the actuating coils 20a, 20b, 20c residing thereon. As can be seen in FIG. 2, the actuating coils 20a, 20b, 20c are disposed on a circle having its center identical with the optical axis of the lens unit 2. In this embodiment, the actuating coil 20a is located vertically above the optical axis, the actuating coil 20b is located horizontally along the optical axis, and the actuating coil 20c is located 135 degrees of the central angle away from the actuating coils 20a and 20b, respectively. Thus, adjacent ones of the actuating coils, 20a and 20b, 20b and 20c, and 20c and 20a, are separated from each other by 90 degrees of the central angle, 135 degrees of the central angle, and 135 degrees of the central angle, respectively, in order. The actuating coils 20a, 20b, 20c have their respective windings rounded square in shape, and these coils are disposed so that their respective center lines of the rounded squares are directed to radial direction of the circle on which the coils are disposed.

The movable frame 14 is shaped roughly in a doughnut and is located in parallel with the fixed plate 12. In a center aperture of the movable frame 14, the image stabilizing lens 16 is fitted. The rectangular actuating magnets 22 are embedded on the circle on the movable frame 14 and disposed in positions corresponding to the actuating coils 20a, 20b, 20c, respectively. In this specification, "positions corresponding to the actuating coils" are referred to as the positions substantially affected by the magnetic field developed by the actuating coils. Each of the actuating magnets 22 has its reverse side provided with a rectangular back yoke 28 so that the magnetic flux from the actuating magnet 22 can be efficiently directed to the fixed plate 12.

On a reverse side of each actuating coil on the fixed plate 12, namely, on the opposite side of the movable frame 14, a rectangular attracting yoke 26 is attached. The movable frame 14 is attracted onto the fixed plate 12 due to the magnetic force applying from each actuating magnet 22 onto the corresponding attracting yoke 26. In this embodiment, the magnetic line of force from the actuating magnet 22 efficiently reaches the attracting yoke 26 because the fixed plate 12 is formed of non-magnetic material.

The annular member 15 is an element annularly shaped and surrounding the movable frame 14. The annular member 15 has three engagement projection contacts 15a in its inner circumferential surface, and they are separated 120 degrees of central angle from each other and protrude inward in radial directions. As can be seen in FIG. 2, on the other hand, the movable frame 14 has three engagement projections 14a in its outer circumference, and they are separated 120 degrees of central angle from each other and protrude outward in the radial directions so as to engage with the corresponding ones of the engagement projection contacts 15a. When the movable frame 14 is rotated and reaches the predetermined position, the engagement projections 14a are engaged with the engagement projection contacts 15a to lock the movable frame 14. The engagement of the engagement projections 14a and the engagement projection contacts 15a permits the movable frame 14 to be retained in the position where the center of the image stabilizing lens 16 is aligned with the optical axis of the lens barrel 6.

There are also three of raised portions 15b in the inner circumferential surface of the annular member 15, and they are separated 120 degrees of central angle from each other and extend inward in radial directions. The raised portions 15b protrude from the annular member 15 radially inward so as to partially cover the outer circumferential portion of the movable frame 14. The raised portions 15b has fixed holder magnets 50 mounted on their respective tips. The fixed holder magnets 50 are located in positions corresponding to three of the attracting magnets 30 serving as the movable holder magnets (the attracting magnets 30 will be referred to also as "movable holder magnets 30" hereinafter). The movable holder magnets 30 and the fixed holder magnets 50 are oriented so as to repel against each other. When the movable frame 14 is rotated to the predetermined position, the repelling force from the movable holder magnets 30 and the fixed holder magnets 50 urges the movable frame 14 to rotate, and the movable frame 14 is locked in position where the engagement projections 14a and the engagement projection contacts 15a are engaged with each other. In this embodiment, the movable holder magnets 30 and the fixed holder magnets 50 together constitute a retaining means.

A manual locking element 52 extends from the outside of the annular member 15 inwardly in the radial directions, and it has its tip machined in a U-shaped dent 52a. The annular stop element 52 is supported movable in the circumferential directions along the outer circumferential surface of the annular member 15, where a user can manually handle an operation portion (not shown) provided in the lens barrel 6 so as to cause a displacement of the manual locking element 52 from a position depicted by solid line to a position depicted in phantom line in FIG. 2. On the other hand, the engagement pin 54 is attached to the outer circumference of the movable frame 14, and as a result of the manual locking element 52 is moved, the engagement pin 54 is engaged in the U-shaped dent 52a. Hence, as the user touches the operation portion (not shown) to handle the manual locking element 52, it moves till its engagement pin 54 is engaged in the U-shaped dent 52a, which causes the movable frame 14 to rotate. When the manual locking element 52 reaches the position depicted by the phantom line, the engagement projection 14a on the movable frame 14 and the engagement projection contacts 15a on the annular member 15 are engaged with each other to retain the movable frame 14 in the position. Otherwise, the user touches the operation unit (not shown) to handle the manual locking element 52 to move it in the reverse direction to the aforementioned direction, the engagement pin 54 is engaged in the U-shaped dent 52a to force the movable frame 14 to rotate reversely, which results in the movable frame 14 being released. In this embodiment, the movable stop element 52 and the engagement pin 54 together constitute a manual release mechanism.

FIG. 5(a) is a partial enlarged top plan view showing positional relations among the actuating coil 20a, the corresponding ones of the actuating magnets 22, the back yokes 28, and the attracting yokes 26, and FIG. 5(b) is a partial enlarged frontal plan view. As can be seen in FIG. 2 and FIGS. 5(a) and 5(b), the actuating magnet 22, the back yoke 28, and the attracting yoke 26, which are all shaped in a rectangle, have their respective longer sides extended along one another while having their respective shorter sides similarly extended along one another. Also, the actuating coil 20a has its sides laid in parallel with the longer and shorter sides of the corresponding one of the rectangular back yoke 28. The actuating magnets 22 have their respective magnetic neutral axes C coincide with radii of the circle on which the actuating magnets 22 are disposed. In this manner, the actuating magnets 22 receive the drive force in tangential directions to the circle as the current flows in the corresponding actuating coils. The remaining actuating coils 20b, 20c are laid in the similar positional relations with their respective corresponding ones of the actuating magnets 22, the back yokes 28, and the attracting yokes 26. In this specification, the terms "magnetic neutral axis C" mean the line connecting transit points from one polarity to another dominated by S- and N-poles which are defined as the opposite ends of the actuating magnet 22. Thus, in this embodiment, the magnetic neutral axis C passes the midpoints of the longer sides of the rectangular actuating magnet 22. Also, as shown in FIG. 5(a), the actuating magnet 22 has its polarities varied in the depthwise direction as well, where the lower left and the upper right in FIG. 5(a) assume the polarity of South (S) while the lower right and the upper left exhibit the polarity of North (N).

As will be recognized in FIGS. 2 to 5, the actuating coils 20a, 20b, 20c respectively surround the magnetic sensors 24a, 24b, 24c. Each of the magnetic sensors has the center of sensitivity S positioned in the magnetic neutral axis C of the actuating magnet 22 when the movable frame 14 is in its neutral position. In this embodiment, a hole element is used for the magnetic sensor.

FIGS. 6 and 7 are diagrams illustrating relations of a displacement of the actuating magnet 22 and a signal generated from the magnetic sensor 24a. As shown in FIG. 6, when the center of sensitivity S of the magnetic sensor 24a is in the magnetic neutral axis C of the actuating magnet 22, the output signal from the magnetic sensor 24 is at a level of naught. As the movable frame 14 is moved along with the actuating magnet 22 thereon to resultantly deviate the center of sensitivity S of the magnetic sensor 24a from the magnetic neutral axis, the output signal from the magnetic sensor 24a varies. As shown in FIG. 6, when the actuating magnet 22 is moved in directions along the X-axis, namely, in the directions orthogonal to the magnetic neutral axis C, the magnetic sensor 24a produces a sinusoidal signal. Thus, when the displacement is minute, the magnetic sensor 24a generates a signal approximately in proportion to the displacement of the actuating magnet 22. In this embodiment, when the displacement of the actuating magnet 22 falls within a range less than 3% of the longer side of the actuating magnet 22, the signal output from the magnetic sensor 24a is approximately in proportion to the distance from the center of sensitivity S of the magnetic sensor 24a to the magnetic neutral axis C. Also, in this embodiment, the actuator 10 effectively works so far as the outputs from the magnetic sensors are approximately in proportion to the distance.

As will be recognized in FIGS. 7(a) to 7(c), when the magnetic neutral axis C of the actuating magnet 22 lies in the center of sensitivity S of the magnetic sensor 24a, the output signal from the magnetic sensor 24a is at the level of naught either in the case of FIG. 7(b) where the actuating magnet 22 is rotated or in the case of FIG. 7(c) where the actuating magnet 22 is moved in directions along the magnetic neutral axis C. Moreover, as shown in FIGS. 7(d) to 7(f), when the magnetic neutral axis C of the actuating magnet 22 deviates from the center of sensitivity S of the magnetic sensor 24a, a signal output from the magnetic sensor 24a is that which is in proportion to a radius r of a circle of which center is equivalent to the center of sensitivity S and with which the magnetic neutral axis C of the actuating magnet 22 is tangential. Thus, for the identical radius r of the circle to which the magnetic neutral axis C of the actuating magnet 22 is tangential, signals at the same level are produced from the magnetic sensor 24a in any of the cases as in FIG. 7(d) where the actuating magnet 22 is moved in the directions orthogonal to the magnetic neutral axis C, as in FIG. 7(e) where the actuating magnet 22 is translated and rotated, and as in FIG. 7(f) where the actuating magnet 22 is translated in an arbitrary direction.

Although embodiments in terms of the magnetic sensor 24a has been described herein, the remaining magnetic sensors 24b, 24c produce the similar signals under positional relations with the corresponding actuating magnets 22, as well. Hence, analyzing the signals detected by the magnetic sensors 24a, 24b, 24c, respectively, enables to specify the position of the movable frame 14 relative to the fixed plate 12 after the translation and rotation movements.

As can be seen in FIG. 2, three of the steel balls 18 are disposed on the outer circle from the one on which the actuating coils of the fixed plate 12 are disposed. The steel balls 18 are separated from each other at an interval of 120-degree central angle, with one of the steel balls 18 being disposed between the actuating coils 20a and 20b. As depicted in FIG. 3, the steel balls 18 are attracted to the movable frame 14 by virtue of the attracting magnets 30 embedded in positions corresponding to the steel balls 18, respectively. The steel balls 18 are thus attracted to the movable frame 14 by the attracting magnets 30 while the movable frame 14 is attracted to the fixed plate 12 by the activating magnets 22, and resultantly, the steel balls 18 are sandwiched between the fixed plate 12 and the movable frame 14. This enables the movable frame 14 to be supported in the plane in parallel with the fixed plate 12, and the rolling of the steel balls 18 held between these two members permits the movable frame 14 to translate and rotate relative to the fixed plate 12 in an arbitrary direction.

The steel ball contacts 32 are mounted on both the fixed plate 12 and the movable frame 14 in their respective outer peripheries. When the movable frame 14 is moved with the steel balls 18 being sandwiched between the fixed plate 12 and the movable frame 14, the steel balls 18 roll on the steel ball contacts 32. Thus, the relative movement of the movable frame 14 to the fixed plate 12 would not cause friction due to either of the members sliding on each other. Preferably, the steel ball contacts 32 are finished in smooth surfaces and made of material having high surface hardness so as to reduce resistance of the steel balls 18 to the steel ball contacts 32 due to the rolling of the steel balls.

Furthermore, in this embodiment, the steel ball contacts 32 are made of non-magnetic material so that magnetic line of force from the attracting magnet 30 efficiently reaches the steel balls 18. Also, in this embodiment, although the steel spheres are used for the steel balls 18, they are not necessarily spherical objects. Thus, they can be replaced with any alternatives that have their respective contact surfaces with the steel ball contacts 32 generally spherical. Such forms are referred to as a spherical member in this specification.

Then, referring to FIG. 8, the control of the actuator 10 will be described. FIG. 8 is a block diagram showing system architecture for the signal processing in a controller 36. As can be seen in FIG. 8, vibrations of the lens unit 2 is detected by two of the gyros 34a, 34b momentarily, and the detection results are transferred to lens position command signal generating means or arithmetic operation circuits 38a, 38b built in the controller 36. In this embodiment, the gyro 34a is adapted to sense an angular acceleration of the yaw motion of the lens unit 2 while the gyro 34b is adapted to sense the angular acceleration of the pitching motion of the lens unit.

The arithmetic operation circuits 38a, 38b, upon receiving the angular acceleration from the gyros 34a, 34b momentarily, produce command signals instructing the time-varying position to which the image stabilizing lens 16 is to be moved. Specifically, the arithmetic operation circuit 38a twice integrates the angular acceleration of the yawing motion detected by the gyro 34a in the time quadrature process and adds a predetermined correction signal to obtain a horizontal component of the lens position command signal, and similarly, the arithmetic operation circuit 38b arithmetically produces a vertical component of the lens position command signal from the angular acceleration of the pitching motion detected by the gyro 34b. The lens position command signal obtained in this manner is used to time-varyingly move the image stabilizing lens 16, so that an image focused on the film plane F within the camera body 4 is shaken but stabilized even when the lens unit 2 is vibrated during exposure to light in taking a picture.

A coil position command signal producing means built in the controller 36 is adapted to produce coil position command signals associated to each actuating coils on the basis of the lens position command signal generated by the arithmetic operation circuits 38a, 38b. The coil position command signal is the one which indicates the positional relation between the actuating coils 20a, 20b, 20c and their respective corresponding actuating magnets 22 in the case that the image stabilizing lens 16 is moved to the position designated by the lens position command signal. Specifically, when the actuating magnets 22 in pairs with their respective actuating coils are moved to the positions designated by coil position command signals, the image stabilizing lens 16 is moved to the position where the lens position command signal instructs to move to. In this embodiment, since the actuating coil 20a is vertically above the optical axis, the coil position command signal related to the actuating coil 20a is equivalent to the horizontal component of the lens position command signal produced from the arithmetic operation circuit 38a. Also, since the actuating coil 20b is positioned lateral to the optical axis, the coil position command signal related to the actuating coil 20b is equivalent to the vertical component of the lens position command signal produced from the arithmetic operation circuit 38b. Moreover, the coil position command signal related to the actuating coil 20c is produced from coil position command signal producing means or the arithmetic operation circuit 40 on the basis of both the horizontal and vertical components of the lens position command signal.

On the other hand, a displacement of the actuating magnet 22 relative to the actuating coil 20a, which is determined by the magnetic sensor 24a, is amplified at a predetermined magnification by a magnetic sensor amplifier 42a. A differential circuit 44a allows for the current to flow in the actuating coil 20a at the rate in proportion to the difference between the horizontal component of the coil position command signal from the arithmetic operation circuit 38a and the displacement of the actuating magnet 22 in a pair with the actuating coil 20a from the magnetic sensor amplifier 42a. Thus, as the difference between the coil position command signal and the output from the magnetic sensor amplifier 42a is naught, no current flows in the actuating coil 20a, which results in the force activating the actuating magnet 22 also becoming naught.

Similarly, the displacement of the actuating magnet 22 relative to the actuating coil 20b, which is determined by the magnetic sensor 24b, is amplified at a predetermined magnification by a magnetic sensor amplifier 42b. A differential circuit 44b allows for the current to flow in the actuating coil 20b at the rate in proportion to the difference between the vertical component of the coil position command signal from the arithmetic operation circuit 38b and the displacement of the actuating magnet 22 in a pair with the actuating coil 20b from the magnetic sensor amplifier 42b. Thus, as the difference between the coil position command signal and the output from the magnetic sensor amplifier 42b is naught, no current flows in the actuating coil 20b, which results in the force activating the actuating magnet 22 also becoming naught.

Also similarly, the displacement of the actuating magnet 22 relative to the actuating coil 20c, which is determined by the magnetic sensor 24c, is amplified at a predetermined magnification by a magnetic sensor amplifier 42c. A differential circuit 44c allows for the current to flow in the actuating coil 20c at the rate in proportion to the difference between the coil position command signal from the arithmetic operation circuit 40 and the displacement of the actuating magnet 22 in a pair with the actuating coil 20c from the magnetic sensor amplifier 42c. Thus, as the difference between the coil position command signal and the output from the magnetic sensor amplifier 42c is naught, no current flows in the actuating coil 20c, which results in the force activating the actuating magnet 22 also becoming naught.

With reference to FIG. 9, described now will be the relation of the lens position command signal with the coil position command signal in the case of translating the movable frame 14. FIG. 9 is a diagram depicting positional relations of the actuating coils 20a, 20b, 20c disposed on the fixed plate 12 with three of the actuating magnets 22 deployed on the movable frame 14. First, three of the actuating coils 20a, 20b, 20c are respectively located in points L, M, N on a circle of a radius R with its center coinciding with the origin (or the point zero) Q of the coordinate system. The magnetic sensors 24a, 24b, 24c are also located in such a manner that their respective centers S of sensitivity are coincident with the points L, M, N, respectively. When the movable frame 14 is in a neutral position, or when the center of the image stabilizing lens 16 is in the optical axis, the midpoints of the magnetic neutral axes C of the actuating magnets 22 in pairs with the actuating coils are also coincident with the points L, M, N, respectively. Assuming that the horizontal axis X and the vertical axis Y having the origin Q in common respectively meet another axis V at 135 degrees at the origin, the actuating magnets have their respective magnetic neutral axes C coinciding with the X-, Y-, and V-axes, respectively.

Then, when the movable frame 14 is moved to cause the center of the image stabilizing lens 16 to shift to a point $Q_1$ and is further moved in the counterclockwise direction by an angle $\theta$ about the point $Q_1$, the midpoints of the magnetic neutral axes C of the actuating magnets 22 are shifted to points $L_1$, $M_1$, $N_1$, respectively. In order to shift the movable frame 14 to such a position, it is required that the coil position command signals related to the actuating coils 20a, 20b, 20c should have their respective signal levels in proportion to radii of circles which have their respective centers coinciding with the points L, M, N, respectively, and which circles are tangential to lines $Q_1L_1$, $Q_1M_1$, $Q_1N_1$, respectively. Those radii of the circles are denoted by $r_X$, $r_Y$, $r_V$, respectively.

Positive and negative conditions of the coil position command signals $r_X$, $r_Y$, $r_V$ are determined as depicted in FIG. 9. Specifically, the coil position command signal $r_X$, which is to shift the point $L_1$ to the first quadrant, is positive, while the same that is to shift to the second quadrant is negative, and similarly, the command signal $r_Y$, which is to shift the point $M_1$ to the first quadrant, is positive while the same that is to shift to the fourth quadrant is negative. In addition to that, the coil position command $r_V$, which is to shift the point $N_1$ below the V-axis, is determined as positive, while the same that is to shift above the V-axis is negative. As with positive and negative conditions for angles, the clockwise direction is given a positive sign. Thus, if the movable frame 14 is rotated from the neutral position in the clockwise direction, the coil position command signals $r_X$, $r_Y$, $r_V$ assume positive, negative, and negative, respectively.

Also, it is now assumed that the coordinates of the point $Q_1$, $L_1$, $N_1$ are (j, g), (i, e) and (k, h), respectively, and that the V- and Y-axes meet at an angle $\alpha$. Furthermore assumed is that there is an intersection P of an auxiliary line A passing the point M and in parallel with the line $Q_1L_1$ with another auxiliary line B passing the point L and in parallel with the line $Q_1M_1$.

Applying now the law of sines to a right triangle LMP, the following equations are given:

$$\frac{\overline{LP}}{\sin(45° + \theta)} = \frac{\overline{MP}}{\sin(45° - \theta)} \qquad (1)$$
$$= \frac{\sqrt{2}R}{\sin 90°}$$
$$= \sqrt{2}R$$

From the above equations, obtained are the following formulae:

$$\overline{LP} = R(\cos\theta + \sin\theta) \qquad (2)$$

$$\overline{MP} = R(\cos\theta - \sin\theta) \qquad (3)$$

The coordinates e, g, h, i, j, and k are respectively expressed by using the terms R, $r_X$, $r_Y$, $r_V$, $\theta$, and $\alpha$, as follows:

$$e = -r_X \sin\theta + R$$

$$g = e - (\overline{MP} - r_Y)\cos\theta = -r_X\sin\theta + r_Y\cos\theta - R\cos\theta(\cos\theta - \sin\theta) + R$$

$$h = -R\cos\alpha - r_V\sin(\alpha + \theta)$$

$$i = r_X\cos\theta$$

$$j = i - (\overline{MP} - r_Y)\sin\theta = r_X\cos\theta + r_Y\sin\theta - R\sin\theta(\cos\theta - \sin\theta)$$

$$k = -R\sin\alpha + r_V\cos(\alpha + \theta) \qquad (4)$$

As to a right triangle with the apexes of the coordinates (k, g), (j, g), and (k, h), a relation established can be expressed as in the following equations:

$$\frac{j - k}{g - h} = \tan(\alpha + \theta) \qquad (5)$$

$$= \frac{\sin(\alpha + \theta)}{\cos(\alpha + \theta)}$$

$$= \frac{\sin\alpha\cos\theta + \cos\alpha\sin\theta}{\cos\alpha\cos\theta - \sin\alpha\sin\theta}$$

$$= \frac{r_X\cos\theta + r_Y\sin\theta - R\sin\theta(\cos\theta - \sin\theta) + R\sin\alpha - r_V\cos(\alpha + \theta)}{-r_X\sin\theta + r_Y\cos\theta - R\cos\theta(\cos\theta - \sin\theta) + R + R\cos\alpha + r_V\sin(\alpha + \theta)}$$

The above equations in (5) can be expanded and rearranged as in the following equation:

$$r_X \cos\alpha - r_Y \sin\alpha - r_V = R(\sin\alpha + \cos\alpha)\sin\theta + R\sin\theta \quad (6)$$

Besides, in case of translating the movable frame 14, θ=0 is satisfied, and the above equation (6) are reorganized as follows:

$$r_X \cos\alpha - r_Y \sin\alpha - r_V = 0 \quad (7)$$

In this embodiment, also, α=45° is satisfied, and the equation (7) can be abbreviated as follows:

$$r_V = \frac{(r_X - r_Y)}{\sqrt{2}} \quad (8)$$

Thus, in this embodiment, when the image stabilizing lens 16 has its center translated to the coordinates (j, g) in response to the lens position command signal, the coil position command signals $r_X$ and $r_Y$ having their respective signal levels in proportion to the coordinates j and g are generated for the actuating coils 20a and 20b, respectively, while the coil position command signal $r_V$ is computed by applying the equation (8), for the actuating coil 20c.

The coil position command signal $r_X$ is identical with the output signal from the arithmetic operation circuit 38a in FIG. 8 while the coil position command signal $r_Y$ is identical with the output signal from the arithmetic operation circuit 38b. Similarly, the coil position command signal $r_V$ is identical with the output signal from the arithmetic operation circuit 40, which performs an arithmetic operation equivalent to the process provided in the equation (8).

Then, referring to FIG. 10, a relation of the lens position command signal with the coil position command signal in the case of rotating the movable frame 14. FIG. 10 is a diagram illustrating the coil position command signal in the case that the movable frame 14 is translated and rotated. As can be seen in FIG. 10, first the movable frame 14 is translated to cause the center of the image stabilizing lens 16 attached to the same to shift from the point Q to another point $Q_2$, and accordingly, the actuating magnets 22 mounted on the movable frame 14 are moved from the points L, M, N to points $L_2$, $M_2$, $N_2$, respectively. For such translating motion, the coil position command signals $r_X$, $r_Y$, $r_V$ are produced. The signal levels of the coil position command signals can be obtained through the aforementioned equations as in (8). Now obtained will be the command signals $r_{X\eta}$, $r_{Y\eta}$, $r_{V\eta}$ in the case where the movable frame 14 is rotated about the point $Q_2$ by an angle η in the counterclockwise direction.

Similar to the case depicted in FIG. 9, first assuming that the coordinates of the point $Q_2$ and the contact point of the line $Q_2N_2$ with a circle of radius $r_V$ with the center N are (j, g) and (k, h), respectively, and replacing the term θ in the equation (4) with zero leads to the following relations:

$$g = r_Y \quad (9)$$
$$j = i = r_X$$
$$k = -R\sin\alpha + r_V \cos(\alpha + \theta)$$
$$= -R\frac{1}{\sqrt{2}} + r_V \frac{1}{\sqrt{2}}$$

When the movable frame 14 is rotated about the point $Q_2$ by an angle η in the counterclockwise direction, the points $L_2$, $M_2$, $N_2$ are respectively moved to points $L_3$, $M_3$, $N_3$. It is also assumed that angles at which pairs of segments $Q_2L_2$ and $Q_2L$, $Q_2M_2$ and $Q_2M$, and $Q_2N_2$ and $Q_2N$ meet are denoted by β, δ, and γ, respectively. Additionally assumed is that the segments $Q_2L$, $Q_2M$, and $Q_2N$, have their respective lengths designated as U, W, and V. It is given that the coil position command signals $r_{X\eta}$, $r_{Y\eta}$, $r_{V\eta}$ have their respective signal levels equal to radii of circles having their respective center at the points L, M, N and tangential with lines $Q_2L_3$, $Q_2M_3$, and $Q_2N_3$, respectively, and therefore, the relations expressed as follows can be established:

$$r_{X\eta} = U\sin(\beta+\eta) = U(\sin\beta\cos\eta + \cos\beta\sin\eta)$$
$$r_{V\eta} = -V\sin(\gamma+\eta) = -V(\sin\gamma\cos\eta + \cos\gamma\sin\eta)$$
$$r_{Y\eta} = -W\sin(\delta+\eta) = -W(\sin\delta\cos\eta + \cos\delta\sin\eta) \quad (10)$$

sin β, cos β and other terms can be replaced with the following expressions according to some mathematical relations;

$$\sin\beta = \frac{i}{U} = \frac{r_X}{U} \quad (11)$$
$$\cos\beta = \frac{R-g}{U} = \frac{R-r_Y}{U}$$
$$\sin\gamma = -\frac{r_V}{V}$$
$$\cos\gamma = \frac{\sqrt{2}(i-k)}{V} = \frac{\sqrt{2}r_X + R - r_V}{V}$$
$$\sin\delta = \frac{g}{W} = \frac{-r_Y}{W}$$
$$\cos\delta = \frac{R-i}{W} = \frac{R-r_X}{W}$$

In addition, the relations in the equations in (11) are substituted for their respective corresponding terms in the equations in (10) to eliminate the terms like β, γ, and δ, formulae expressing the relations as follows are obtained:

$$r_{X\eta} = r_X \cos\eta + (R - r_Y)\sin\eta$$
$$r_{V\eta} = r_V \cos\eta - (\sqrt{2}r_X + R - r_V)\sin\eta$$
$$r_{Y\eta} = r_Y \cos\eta - (R - r_X)\sin\eta \quad (12)$$

Thus, in order to shift the movable frame 14 to a point that is determined by first translating the center of the image stabilizing lens 16 to the coordinates (j, g) and then rotating the same about the resultant point by an angle η in the counterclockwise direction, the coil position command signals $r_X$, $r_Y$, $r_V$ are obtained through the formulae (8) and (9) above all, and then the obtained values are substituted for the corresponding terms in the formulae (12) to obtain the coil position command signals $r_{X\eta}$, $r_{Y\eta}$, $r_{V\eta}$, which are to be given for the actuating coils.

In the case where the movable frame 14 is to be rotated about the point Q by the angle η in the counterclockwise direction without the translating motion, the terms $r_X$, $r_Y$, and $r_V$ in the formulae (12) are substituted for zero as follows:

$$r_{X\eta} = R\sin\eta$$
$$r_{V\eta} = R\sin\eta$$
$$r_{Y\eta} = -R\sin\eta \quad (13)$$

Thus, the coil position command signals $r_{Xn}$, $r_{Yn}$, $r_{Vn}$ can be obtained through the arithmetic operations.

Referring to FIG. 11, a function of the locking mechanism of the actuator 10 will now be described. FIG. 11(a) illustrates the movable frame 14 in locked condition, FIG. 11(b) illustrates the movable frame 14 in a transient state from the its locked position to a released position, and FIG. 11(c) shows the movable frame 14 in released condition. First, when a camera 1 of an embodiment according to the present invention is not used, or when an anti-shaking feature of the camera 1 is turned off, the movable frame 14 is locked as in FIG. 11(a). In such a situation, the movable frame 14 is engaged with and secured to the annular member 15, and hence, the movable frame 14 will not jitter inside the annular member 15 without the driving force acting on the movable frame 14, which can retain the center of the image stabilizing lens 16 aligned with the optical axis.

Also, as can be seen in FIG. 11(a), such engagement condition causes the movable holder magnets 30 to slightly deviate from the corresponding ones of the fixed holder magnets 50, and the repelling force between the movable holder magnets 30 and the fixed holder magnets 50 urges the movable frame 14 to rotated in the direction as denoted by arrow D1. This rotation force causes the engagement projections 14a of the movable frame 14 to press against the engagement projection contacts 15a to retain the former engaged with the latter. Thus, after the camera 1 is turned off, the movable frame 14 is maintained in locked condition.

Then, turning the camera 1 on to activate the anti-shaking feature, the controller 36 lets the current flow in the actuating coils 20a, 20b, 20c, respectively, to rotate the movable frame 14 in the clockwise direction (the reverse direction to that denoted by the arrow D1). The coil position command signals $r_{Xn}$, $r_{Y\theta}$, $r_{V\theta}$ are respectively obtained through the equation (13). Beginning with the condition as in FIG. 11(a), the movable frame 14 is rotated in the clockwise direction, and resultantly, the movable holder magnets 30 are brought closer to the fixed holder magnets 50 to develop a greater repelling force between them, which also increases the rotation force to force the movable frame 14 to rotated in the direction denoted by the arrow D1 (in the counterclockwise direction). This rotation force is maximized immediately before the situation as depicted in FIG. 11(b) where the movable holder magnets 30 and the fixed holder magnets 50 come closest each other. As the movable frame 14 is rotated against the rotation force to the point as illustrated in FIG. 11(b), and then further advanced so that the movable holder magnets pass slightly ahead of the fixed holder magnets 50, the direction of the rotation force derived from the repelling force between the movable holder magnets 30 and the fixed holder magnets 50 is inverted into the direction as denoted by arrow D2 (the clockwise direction) as in FIG. 11(b).

In such a situation as the rotation force is inverted in direction, the rotation force to force the engagement projections 14a to engage with the engagement projection contacts 15a no longer arise, and as a consequence, both the members are disengaged from each other. As the movable frame 14 is further rotated to be in the state as illustrated in FIG. 11(c), the movable holder magnets 30 are brought sufficiently apart from the fixed holder magnets 50, and therefore, magnetic force between them is substantially eliminated. While the anti-shaking feature is activated, the movable frame 14 is under control so as not to let the movable holder magnets 30 and the fixed holder magnets 50 substantially affect each other, thereby avoiding a disturbance of the image formed on the film plane F.

On the other hand, turning off the camera 1 to deactivate the anti-shaking feature, the controller 36 lets the current flow in the actuating coils 20a, 20b, and 20c, respectively, so as to rotate the movable frame 14 in the counterclockwise direction (in the direction denoted by the arrow D1). Beginning with the state as shown in FIG. 11(c), the movable frame 14 is rotated in the counterclockwise direction to almost be in the state as in FIG. 11(b), and as a consequence, the repelling force between the movable holder magnets 30 and the fixed holder magnets 50 increases, and this forces the movable frame 14 to pull back in the clockwise direction. As the movable frame 14 is, however, rotated in the counterclockwise direction against the pull backing rotation force, and it passes the position in FIG. 11(b) where the movable holder magnets 30 and the fixed holder magnets 50 come closest to each other, the movable frame 14 is affected by the fixed holder magnets 50 to force it to rotate in the counterclockwise direction. The counterclockwise rotation force causes the engagement projections 14a to engage with the engagement projection contacts 15a, and the movable frame 14 is locked. The movable frame 14 is retained anchored due to the repelling force between the movable holder magnets 30 and the fixed holder magnets 50 even after the current no longer flows in the actuating coils 20a, 20b, and 20c and the drive force dissipates.

On the other hand, when the movable frame 14 cannot be driven by using the actuating coils 20a, 20b, and 20c, for example, because the camera 1 is out of battery, the manual locking element 52 may be used to lock and release the movable frame 14. In the case of locking the movable frame as in FIG. 11(a), turning the manual locking element 52 in the clockwise direction, the U-shaped dent 52a in the manual locking element 52 is fitted on the engagement pin 54. Further urging the manual locking element 52 to rotate in the clockwise direction enables the movable frame 14 to overcome the repelling force between the movable holder magnets 30 and the fixed holder magnets 50 and rotate. When the manual locking element 52 reaches the position depicted by phantom line in FIG. 11(a), the movable holder magnets 30 pass the fixed holder magnets 50 till the magnetic force no longer affects the movable member 14 so as to keep it locked, and eventually, the movable frame 14 is in released condition.

Also, in the case of the state depicted in FIG. 11(c) where the movable frame is disengaged, turning the manual locking element 52 in the counterclockwise direction causes it to push and rotated the movable frame 14 in the counterclockwise direction. Turning the manual locking element 52 to reach the position depicted by the phantom line, the engagement projections 14a on the movable frame 14 are engaged with the engagement projection contacts 15a to lock the movable frame 14. In this position, the movable holder magnets 30 pass the fixed holder magnets 50, and therefore, the repelling force between both the magnets causes the rotation force to move the movable frame 14 in the counterclockwise direction, which retain the movable frame engaged even when the camera 1 is turned off.

Next, referring to FIG. 12, an exemplary circuit of the controller 36 is described. FIG. 12 depicts an example of a circuit controlling the current that flows in the actuating coil 20a. In the circuit in FIG. 12, supplemental circuitry such as power supply lines to activate the operational amplifiers is omitted. First, as can be seen in FIG. 12, supply voltage $+V_{CC}$ and the ground are connected along with electrical resistances R7 and R8 in series as a whole. An operational amplifier OP4 has its positive input terminal connected between the electrical resistances R7 and R8. The operational amplifier OP4 has its negative input terminal connected to an output terminal of the operation amplifier OP4. In this way, the resistances R7 and R8 permit voltage at the output terminal of the operational amplifier OP4 to reach the level of the reference voltage $V_{REF}$ between the supply voltage $V_{CC}$ and the ground potential GND, so that it can be retained at that level.

On the other hand, the supply voltage $+V_{CC}$ is applied between first and second terminals of the magnetic sensor 24a. A third terminal of the magnetic sensor 24a is connected to the reference voltage $V_{REF}$. In this manner, as magnetism affecting the magnetic sensor 24a is varied, a fourth terminal of the magnetic sensor 24a accordingly varies between the levels of $+V_{CC}$ and GND.

The magnetic sensor 24a has its fourth terminal connected to a negative input terminal of an operational amplifier OP1 with a variable resistance VR2 intervening therebetween, and the variable resistance VR2 can be adjusted to regulate the gain of the output from the magnetic sensor 24a. The variable resistance VR1 has its opposite fixed terminals connected to the voltage levels of $+V_{CC}$ and GND, respectively. The variable resistance VR1 has its variable terminal connected to a negative input terminal of the operational amplifier OP1 with the electrical resistance R1 intervening between them. The variable resistance VR1 can be adjusted to regulate the offset voltage of the output from the operational amplifier OP1. Also, the operational amplifier OP1 has its input terminal connected to the reference voltage $V_{REF}$. The operational amplifier OP1 has its output terminal connected to a negative input terminal of the operational amplifier OP1 with the electrical resistance R2 intervening therebetween.

The arithmetic operation circuit 38a producing the coil position command signal related to the actuating coil 20a is connected to a positive input terminal of the operational amplifier OP3. The operational amplifier OP3 has its output terminal connected to a negative input terminal of the operational amplifier OP3. Thus, the operational amplifier OP3 serves as a buffer amplifier of the coil position command signal.

The operational amplifier OP1 has its output terminal connected to a negative input terminal of the operational amplifier OP2 with the electrical resistance R3 intervening between them. Also, the operational amplifier OP3 has its output terminal connected to a positive input terminal of the operational amplifier OP2 with the electrical resistance R4 intervening therebetween. In this manner, a difference of the output from the magnetic sensor 24a from the coil position command signal is produced from an output terminal of the operational amplifier OP2. The operational amplifier OP2 has its positive input terminal connected to the reference voltage $V_{REF}$ with an electrical resistance R5 intervening therebetween, and has its output terminal connected to the negative input terminal of the operational amplifier OP2 with an electrical resistance R6 intervening therebetween. Gains of the positive and negative outputs of the operational amplifier OP2 are defined by these electrical resistances R5 and R6.

The operational amplifier OP2 has its output terminal connected to one of the opposite ends of the actuating coil 20a, and the other end of the actuating coil 20a is connected to the reference voltage $V_{REF}$. Thus, the current equivalent to the voltage difference between the output from the operational amplifier OP2 and the reference voltage $V_{REF}$ flows in the actuating coil 20a. The current flowing in the actuating coil 20a develops magnetic field, and this causes magnetic force to affect on the actuating magnet 22, which eventually brings about a displacement of the actuating magnet 22. Such magnetic force is directed to let the actuating magnet 22 to come close to a position as instructed in the coil position command signal. Once the actuating magnet 22 is moved, the voltage output from the fourth terminal of the magnetic sensor 24a is varied. When the actuating magnet 22 reaches the position instructed in the coil position command signal, the voltages supplied to the positive and negative input terminals of the operational amplifier OP2 become equal to each other, and the current no longer flows in the actuating coil 20a.

The aforementioned operational amplifiers OP1 and OP2 in FIG. 12 are the counterparts of the magnetic sensor amplifier 42a and the differential circuit 44a in FIG. 8. Although the circuitry controlling the current to flow in the actuating coil 20a has been described, the current to flow in the actuating coil 20b is also controlled by means of the similar circuitry. Additionally, the current to flow in the actuating coil 20c can be controlled by means of the similar circuit, but in this situation, the arithmetic operation circuit 40 has its output connected to the positive input terminal of the operational amplifier OP3. The arithmetic operation circuit 40 consists of a differential amplifier functioning equivalent to the operational amplifier OP2, an electric resistance producing divided voltage in $(1/2)^{1/2}$ of the pre-process level, and the like.

With reference to FIGS. 1 and 8, the operation of a preferred embodiment of a camera 1 according to the present invention will be described. First, turning on a start switch (not shown) for an anti-shaking function of the camera 1 allows for the actuator 10 in the lens unit 2 to begin working. The gyros 34a and 34b built in the lens unit 2 time-varyingly detect vibrations in a predetermined frequency band, and the gyro 34a produces a signal of the angular acceleration in the yawing direction to the arithmetic operation circuit 38a while the gyro 34b produces a signal of the angular acceleration in the pitching direction. The arithmetic operation circuit 38a integrates the received angular acceleration signal twice in the time quadrature process to compute a yawing angle, and the computation result is further added with a predetermined correction signal to generate the command signal of the lens position in the horizontal direction. Similarly, the arithmetic operation circuit 38b integrates the received angular acceleration signal twice in the time quadrature process to compute a pitching angle, and the computation result is added with a predetermined correction signal to generate the command signal of the lens position in the vertical direction. Time-varyingly moving the image stabilizing lens 16 to the positions that are instructed in the lens position command signal produced from the arithmetic operation circuits 38a, 38b on the time-varying basis, an image focused on the film plane F within the camera body 4 can be stabilized.

The command signal of the lens position in the horizontal direction produced from the arithmetic operation circuit 38a is transferred to the differential circuit 44a as the coil position command signal $r_X$ related to the actuating coil 20a. Similarly, the command signal of the lens position in the vertical direction produced from the arithmetic operation circuit 38b is transferred to the differential circuit 44b as the coil position command signal $r_Y$ related to the actuating coil 20b. The outputs from the arithmetic operation circuits 38a, 38b are transferred to the arithmetic operation circuit 40, and arithmetic operations as expressed in the formulae (8) enables to generate the coil position command signal $r_V$ for the actuating coil 20c.

On the other hand, the magnetic sensors 24a, 24b, and 24c respectively located inside the actuating coils 20a, 20b, and 20c produce detection signals to the magnetic sensor amplifiers 42a, 42b, and 42c, respectively. The detection signals detected by the magnetic sensors are, after respectively amplified in the magnetic sensor amplifiers 42a, 42b, and 42c, transferred to the differential circuits 44a, 44b, and 44c, respectively.

The differential circuits 44a, 44b, and 44c respectively generate voltages equivalent to the differences between the received detection signals from the magnetic sensors and the coil position command signals $r_X$, $r_Y$, and $r_V$ and respectively permit the currents in proportion to the voltages to flow in the actuating coils 20a, 20b, and 20c. As the currents flow in the actuating coils, the magnetic field in proportion to the currents is developed. By virtue of the magnetic field, the actuating magnets 22, which are disposed in the corresponding positions to the actuating coils, are forced to move closer to the positions designated by the coil position command signals $r_X$, $r_Y$, and $r_V$, respectively, thereby moving the movable frame 14. The actuating magnets 22, once reaching the designated positions by virtue of the coil position command signals, the output from the differential circuit turns to the zero level since the coil position command signals are equal to the detection signals, and the force to move the actuating magnets also becomes naught. As an external disturbance and/or an alteration in the coil position command signals cause the actuating magnets 22 to depart from the positions designated in the coil position command signals, the current flow is resumed in the actuating coils, which enables the actuating magnets 22 to regain the designated positions.

Time-varyingly repeating the aforementioned step permits the image stabilizing lens 16 attached to the movable frame 14 along with the actuating magnets 22 to follow the lens position command signal to the designated position. Thus, the image focused on the film plane F within the camera body 4 is stabilized.

Then, turning off the start switch (not shown) of the antishaking feature in the camera 1, the actuator 10 rotates the movable frame 14 in the counterclockwise direction and lock the movable frame 14. Such locked condition of the movable frame is retained by the repelling force between the movable holder magnets 30 and the fixed holder magnets 50 even after the turning-off of the camera 1. In addition, the user may handle the operation portion (not shown) provided in the lens barrel 6 so as to move the manual locking element 52, and this enables the manual movement of the movable frame 14 into locked or released condition even when the power is off or the camera is out of battery.

In the embodiment of the camera according to the present invention, the movable frame for the image stabilizing actuator can be translated and rotated in the desired directions within a predetermined plane. Hence, the movable frame can be anchored without an additional drive means for locking it.

Also, in the embodiment of the camera according to the present invention, since the repelling force between the movable holder magnets and the fixed holder magnets works to retain the movable frame anchored, no power is consumed to stably lock the movable frame.

With the embodiment of the camera according to the present invention, the manual locking element is used to manually move the movable frame to lock it, and this enables the movable frame to be brought back into an locked condition by hand in the case of being out of battery.

In the embodiment of the camera according to the present invention, the magnetic sensors are used to detect magnetism from the actuating magnets to determine the position of the movable frame, and therefore, the actuating magnets also versatilely serve as those for the magnetic sensors without the additional ones. Since the magnetic sensors are located inside the actuating coils, a point of action of the force applied from each actuating coil to each actuating magnet is almost identical with a point sensed as the position of the actuating magnet by the magnetic sensor, and this enables an accurate detection of the position of the movable frame without an influence of mechanical lash.

In the embodiment of the camera according to the present invention, an interval between the fixing plate and the movable frame is kept constant by virtue of the steel balls, and the rolling of the steel balls between the fixed plate and the movable frame permits the movable member to move relative to the fixed plate, which eliminates affections of frictional resistance of sliding between the fixed plate and the movable frame.

Although the preferred embodiments of the present invention have been described, various modifications can be made to them. The present invention is applied especially to a film camera in the aforementioned embodiments, but it can be applied to any still camera or animation picture camera such as a digital camera, a video camera, and the like. Also, the present invention can be applied to a lens unit used with a camera body of any of the above-mentioned cameras. Additionally, there are applications of the invention in use as an actuator that moves an image stabilizing lens of the camera or as an actuator that moves an XY stage or the like.

In the aforementioned embodiment, although the movable frame is generally disk-like, and the movable frame is locked by means of three of the engagement projections or the locking element provided in the outer circumferential surface of the movable frame and three of the engagement projection contacts or the engagement member in the annular member to respectively engage with them, other structure may be used to lock the movable frame. For instance, any numbers of the engagement projections and the engagement projection contacts may be provided as desired. Also, the annular member may take any shape other than the annular one, and the engagement projections and the annular member may be engaged with each other in any position other than the outer circumference of the movable frame.

Further, in the aforementioned embodiment, the actuating coils are attached to the fixed member while the actuating magnets are attached to the movable member, and instead, the actuating magnets may be attached to the fixed member while the actuating coils are attached to the movable member. Also, in the aforementioned embodiment, three pairs of the actuating coils and the actuating magnets are used, and alternatively, four or more pairs of the actuating coils and the actuating magnets may be employed. Furthermore, in the aforementioned embodiment, permanent magnets serve as the actuating magnets, and the alternative to them may be electromagnets.

In the aforementioned embodiment, magnetic sensor serves as the position sensing means to detect magnetic force from the actuating magnets and determine their respective positions, and alternatively, any position sensing sensors but the magnetic sensors may be substituted to detect the relative positions of the actuating magnets to the actuating coils.

Also, in the aforementioned embodiment, three of the steel balls 18 serve as a movable member supporting means, and alternatively, the movable member supporting means may be replaced with four or more of spherical objects. Otherwise, without using any object spherical in shape, the movable member and the fixed member may have their respective contact surfaces finished in smooth conditions to let the movable member and the fixed member in direct contact with the same slide on each other.

Additionally, in the aforementioned embodiment, the actuating coils are disposed so that pairs of the actuating coils 24a and 24b, 24c and 24a, and 24b and 24c, meet each other at the central angle of 90 degrees, 135 degrees, and 135 degrees, respectively, and alternatively, the position of the actuating coil 24c may be determined so that the central angle at the intersection of the actuating coil 24b with the actuating coil 24c is in the range as expressed in the formula 90+α (0≦α≦90). Otherwise, the central angle at the intersection of the actuating coils 24a and 24b may be any angle other than 90 degrees as desired, and three of the actuating coils meet one another at the central angle ranging from 90 degrees to 180 degrees such as 120 degrees at all the three central angles made by three of the actuating coils.

Moreover, in the aforementioned embodiment, the magnetic neutral axes of the actuating magnets extend all in the radial direction, and alternatively, they may be directed in any way as desired. Preferably, at least one of the actuating magnets is disposed with its magnetic neutral axis extended in the radial direction.

FIG. 13 depicts a modification of the aforementioned embodiment of the present invention where the magnetic neutral axes of the actuating magnets 22 respectively in pairs with the actuating coils 24a and 24b extend as the tangential line to the circle centered at the point Q while the magnetic neutral line of the remaining magnet 22 in a pair with the actuating coil 24c extends coincidental with a radius of the circle. Although omitted in the drawings, the actuating coils, 24a, 24b, 24c are located in the points L, M and N, respectively. In this example, the coil position command signals $r_X$, $r_Y$, and $r_V$ are produced in relation with the actuating coils 24a, 24b and 24c to instruct where to move those magnets from their respective current positions L, M, and N. Due to the coil position command signals, the midpoints of the magnetic neutral axes of the actuating magnets 22 on the points L, M, N in the case of the movable frame 14 located in its neutral position are shifted to the points $L_4$, $M_4$ and $N_4$, respectively, and simultaneously, the center of the image stabilizing lens 16 is shifted from the point Q to the point $Q_3$.

In this modification, the coil position command signal $r_X$, namely, the horizontal component of the lens position command signal is provided to the actuating coil 24b on the point M while the coil position command signal $r_Y$, namely, the vertical component of the lens position command signal is provided to the actuating coil 24a on the point L. Also, in the case depicted in FIG. 13, substituting the coil position command signals $r_X$ and $r_Y$ for the corresponding terms in the formula (8), the coil position command signal $r_V$ thus obtained is given in relation with the actuating coil 24c, which resultantly, causes the point Q to translate by $-r_X$ and $+r_Y$ along the X- and Y-axes, respectively.

BRIEF DESCRIPTIONS OF THE DRAWINGS

Figure 1:
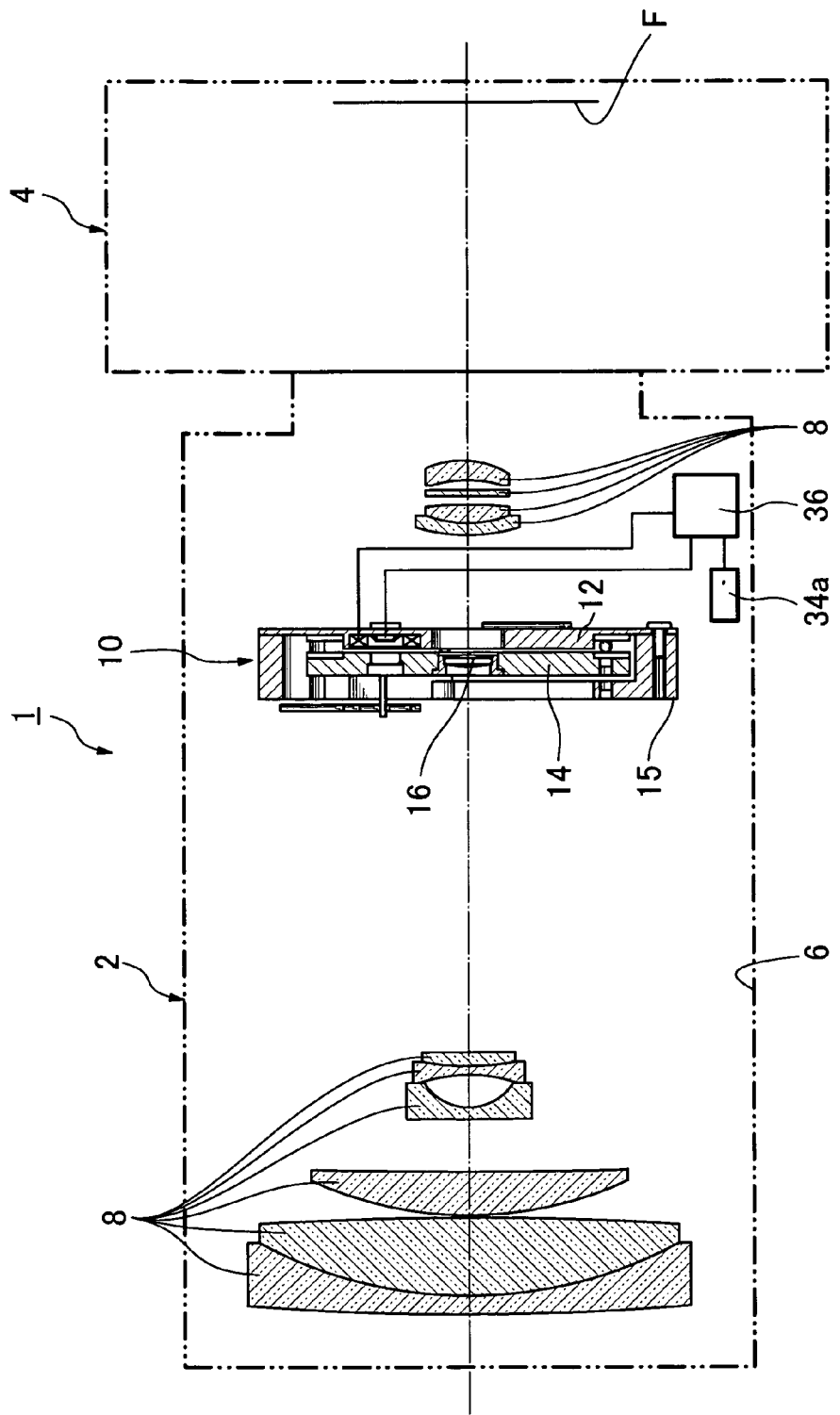
FIG. 1 is a sectional view of an embodiment of a camera according to the present invention.
Figure 2:
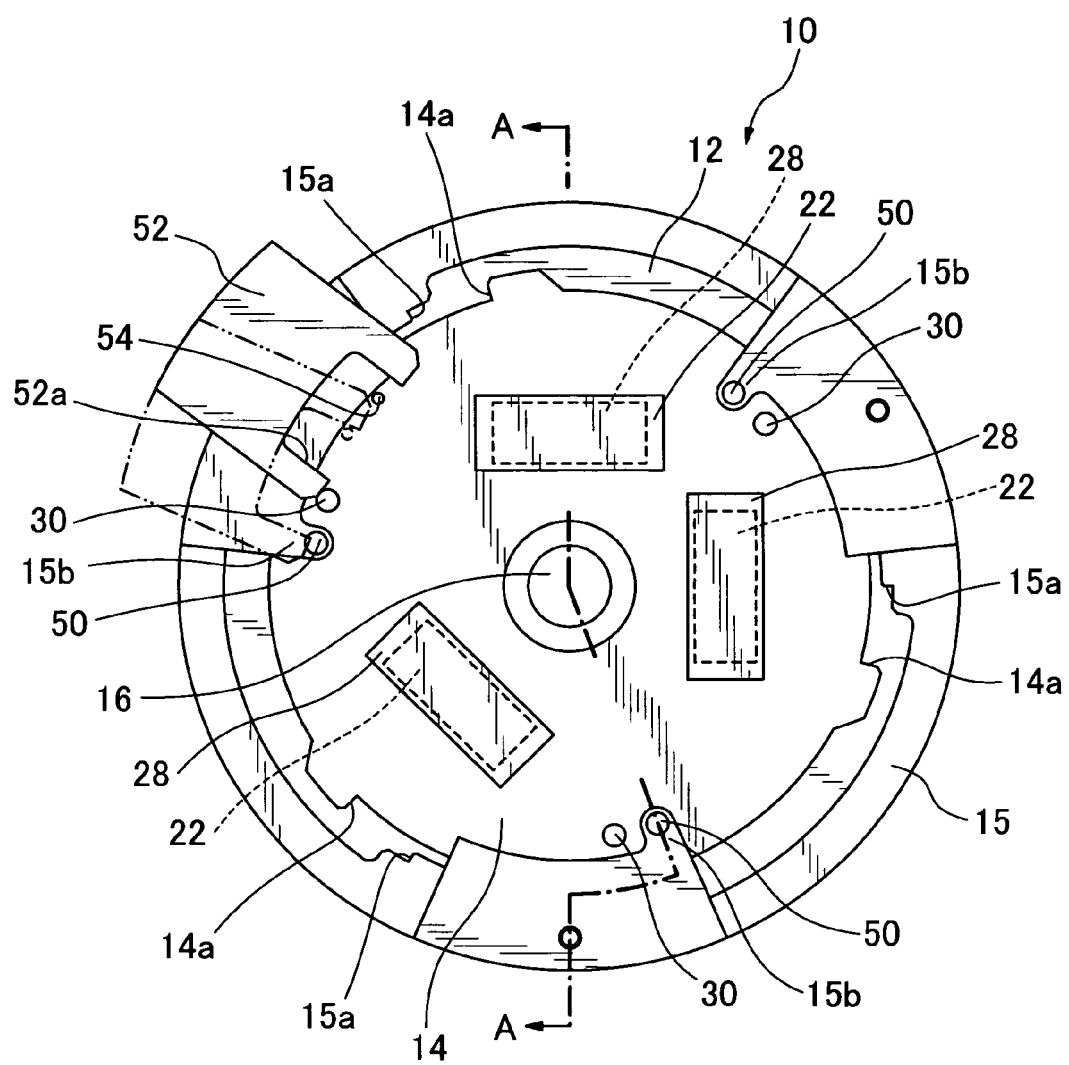
FIG. 2 is a frontal view an actuator used in the embodiment of the camera according to the present invention.
Figure 3:
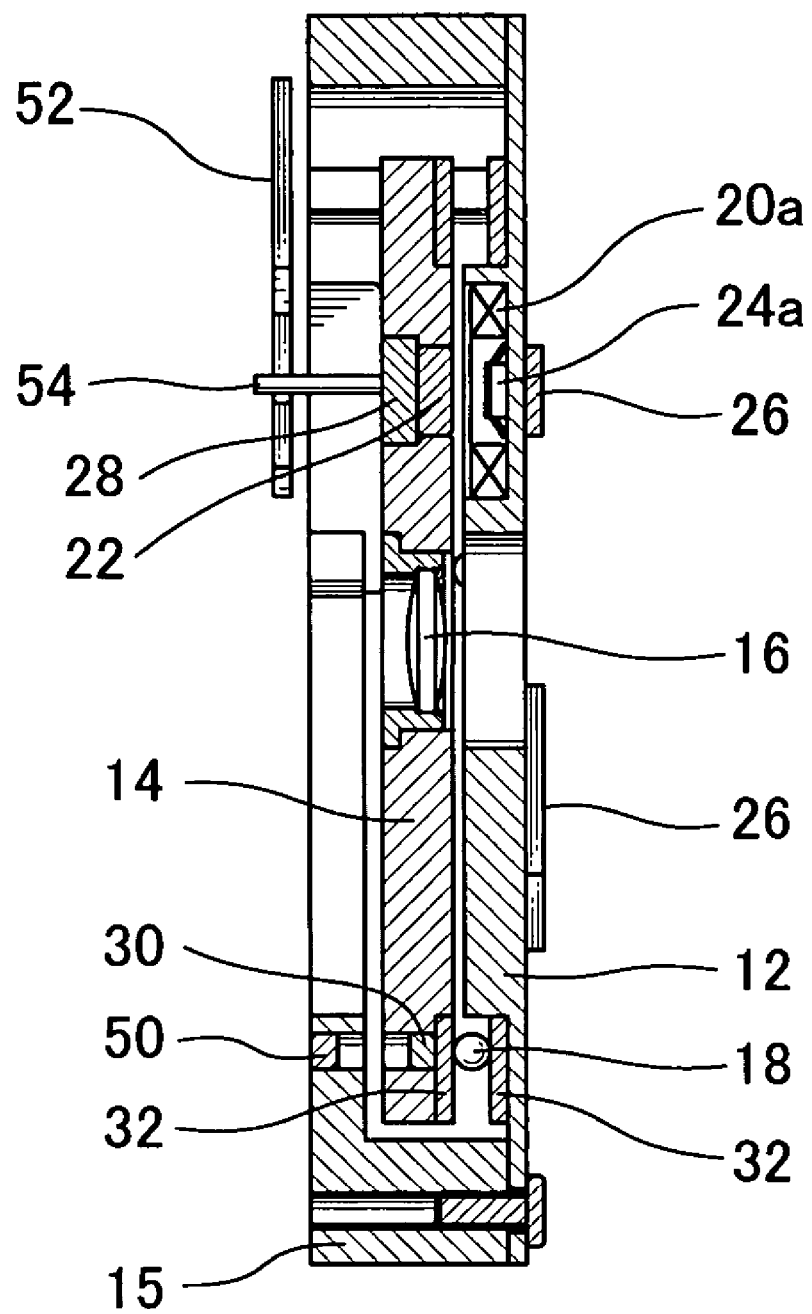
FIG. 3 is a cross-sectional view taken along the line A-A in FIG. 2, showing the actuator used in the embodiment of the camera according to the present invention.
Figure 4:
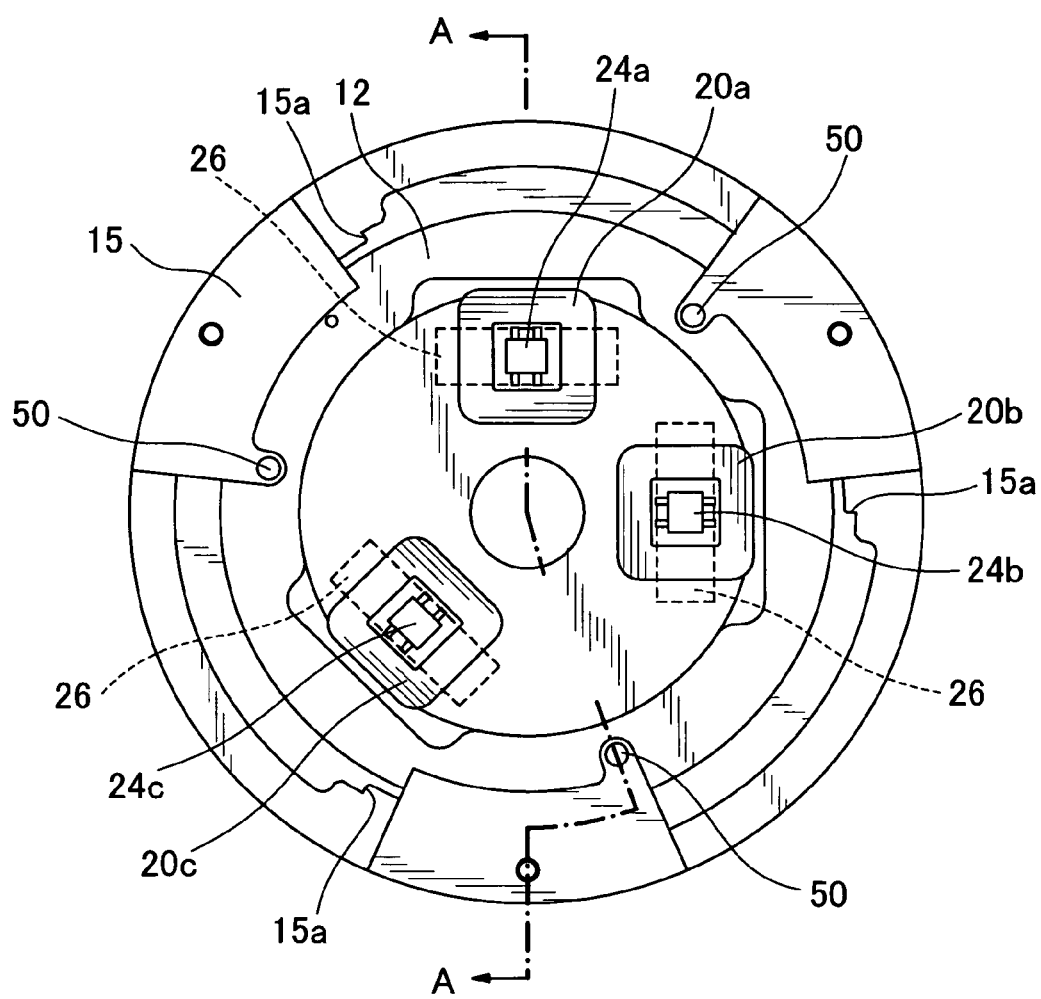
FIG. 4 is a frontal view of the actuator from which a movable frame is removed.
Figure 5A:
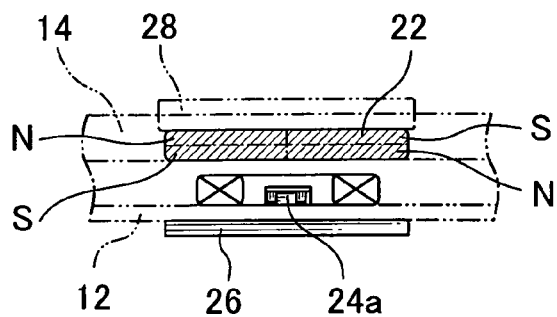
Figure 5B:
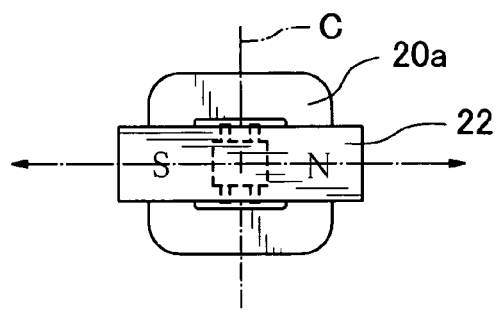
Figure 6:
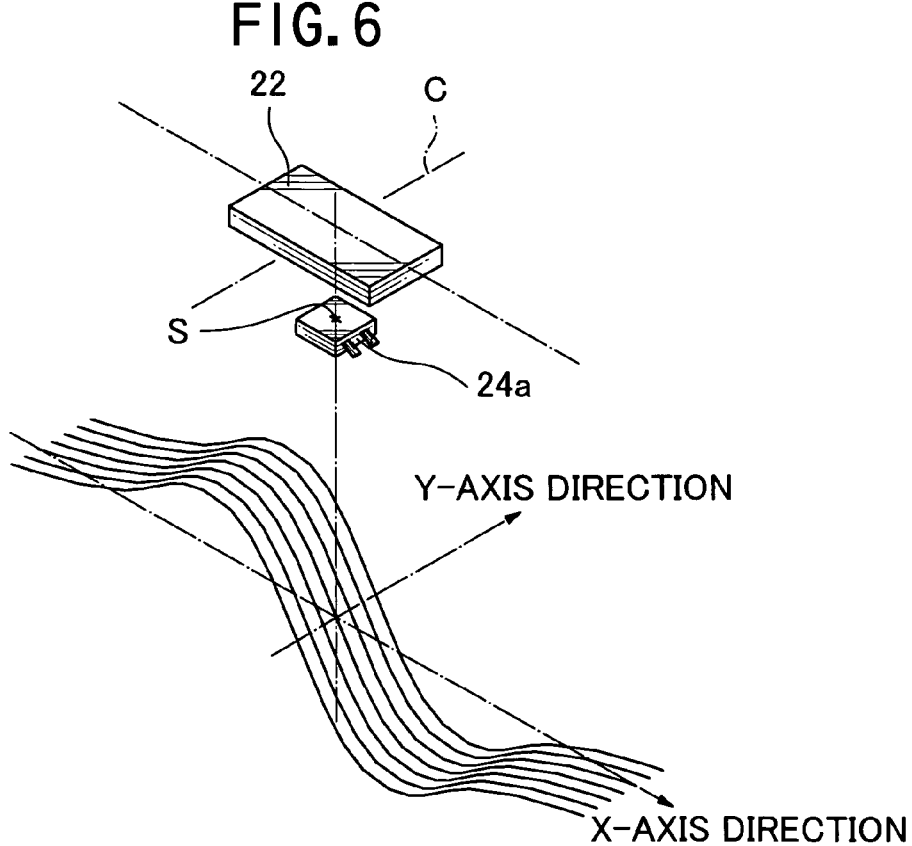
Figure 7A:
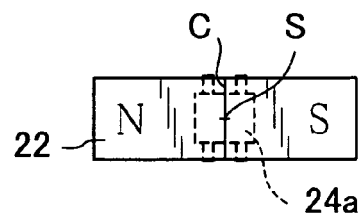
Figure 7B:
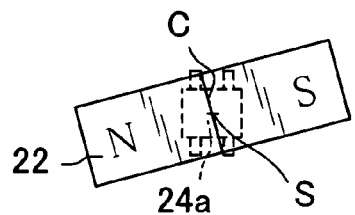
Figure 7C:
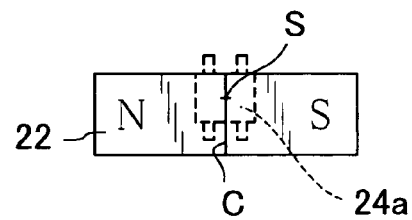
Figure 7D:
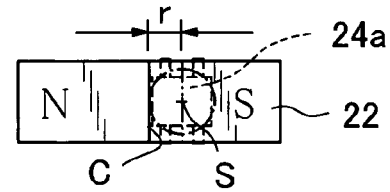
Figure 7E:
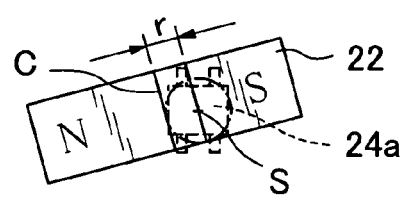
Figure 7F:
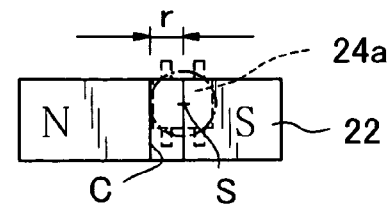
Figure 8:
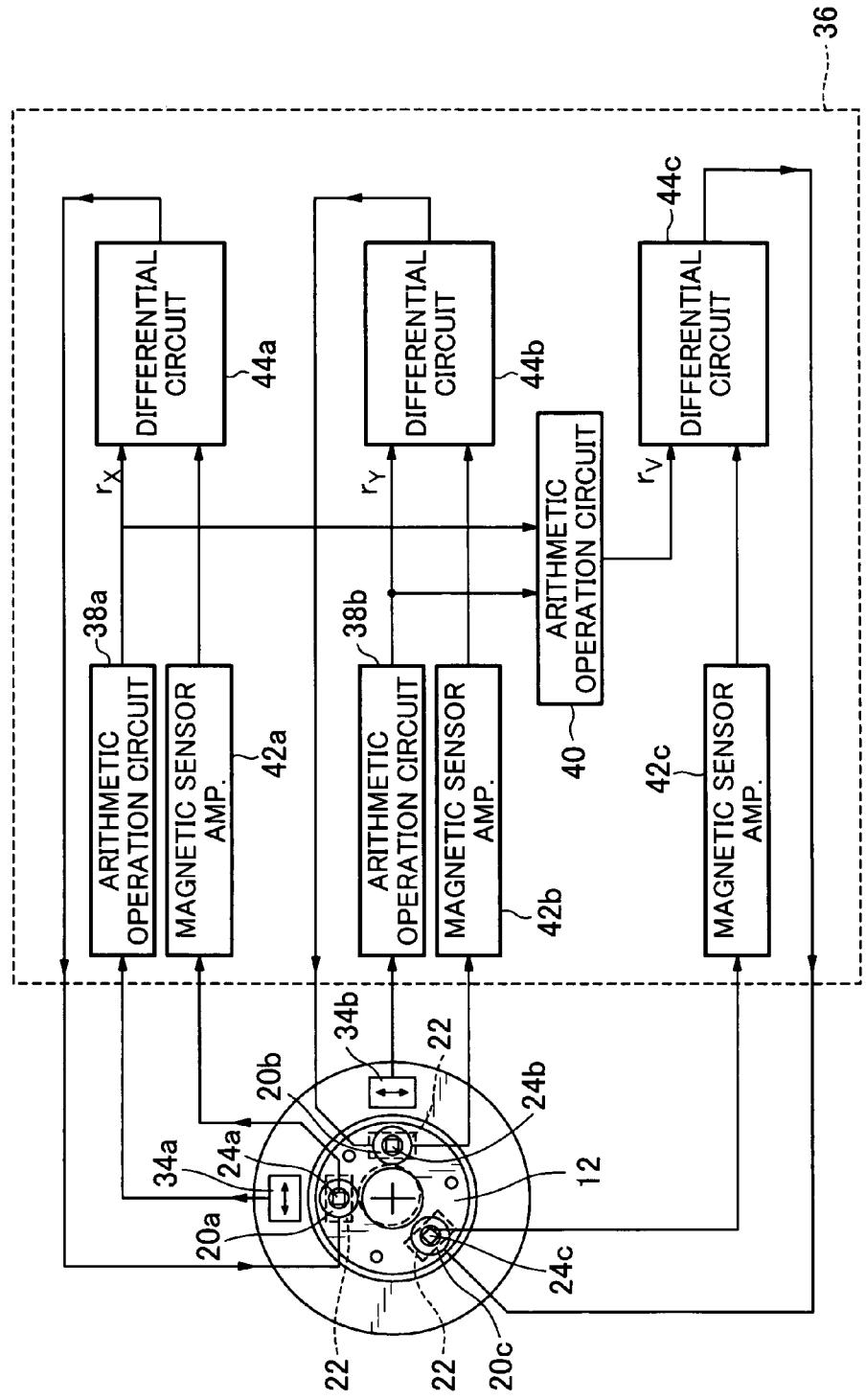
Figure 9:
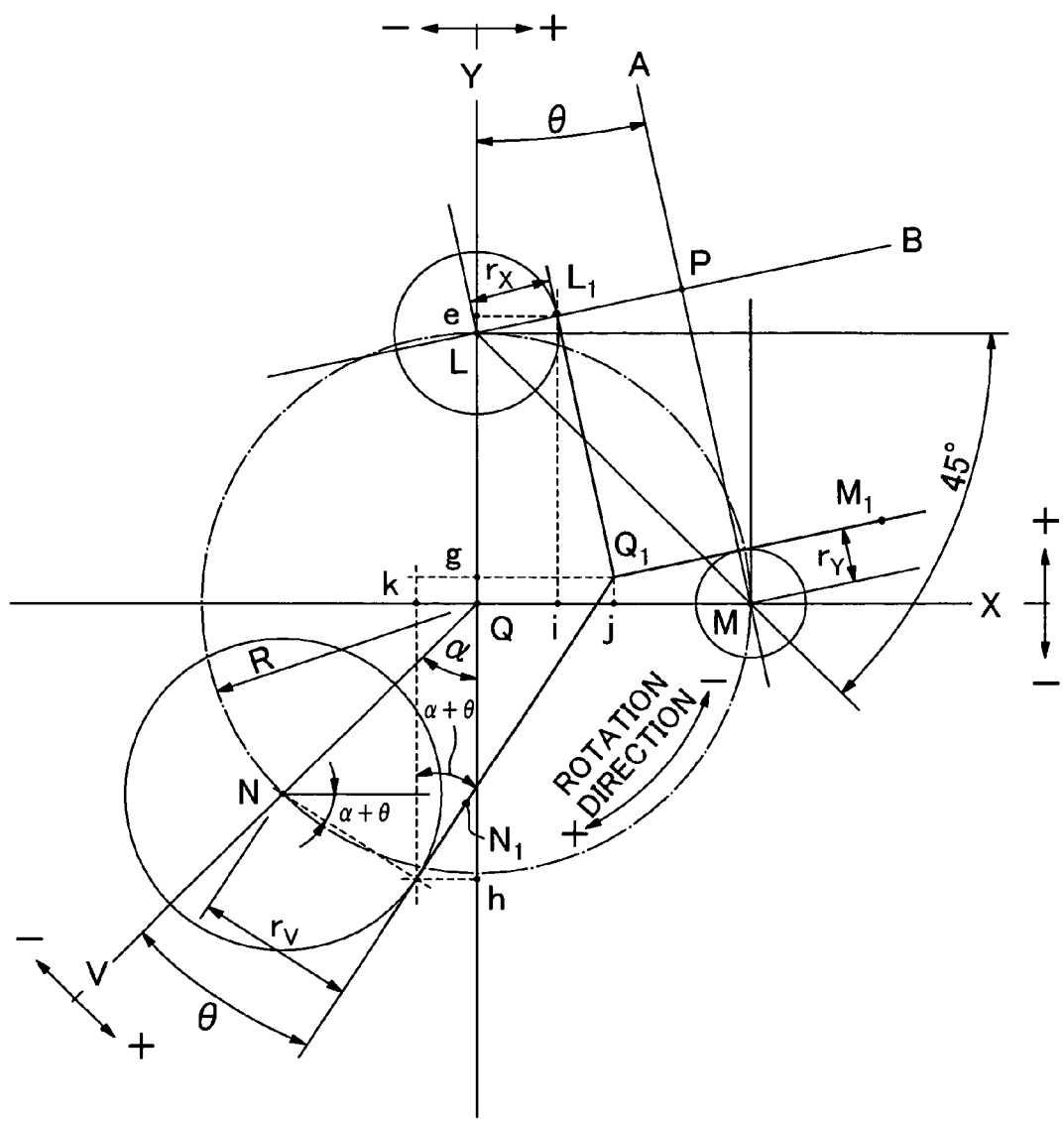
Figure 10:
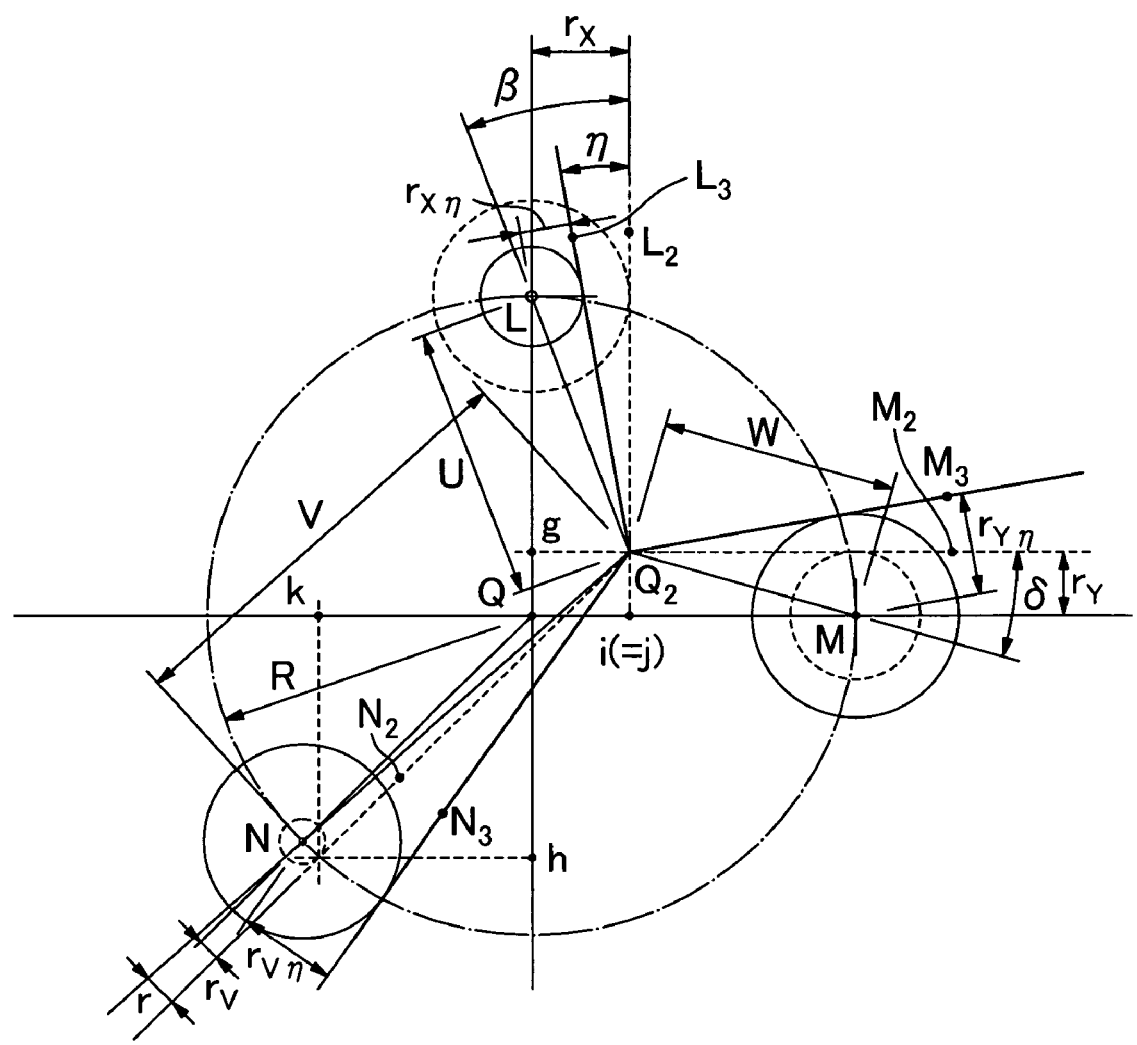
Figure 11A:
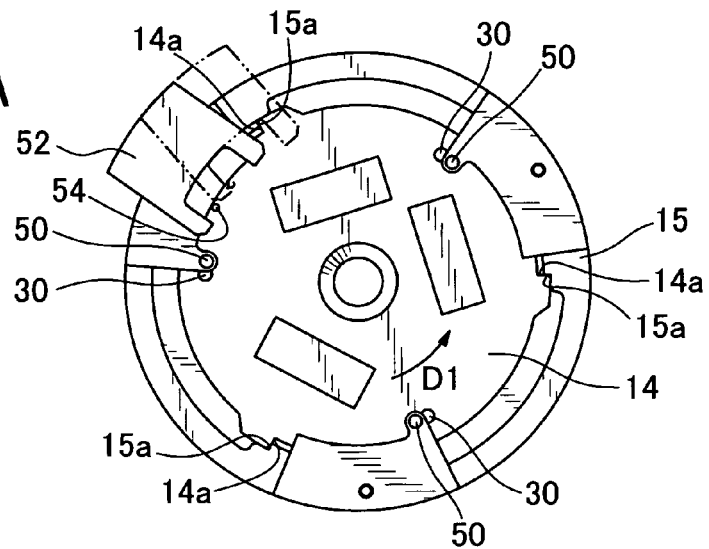
Figure 11B:
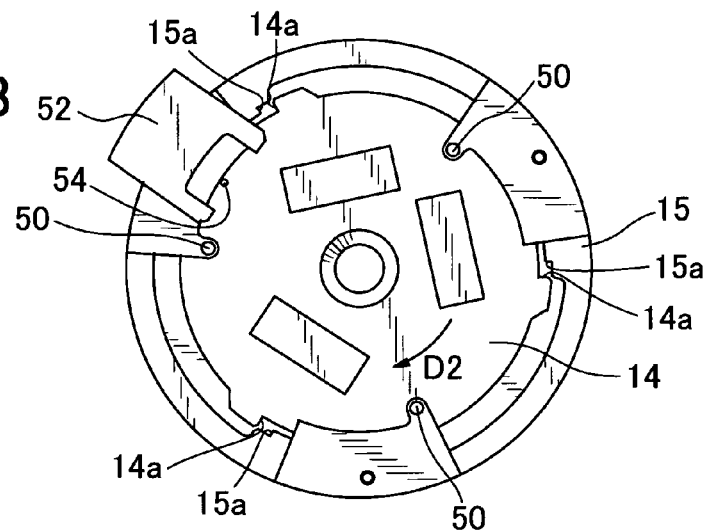
Figure 11C:
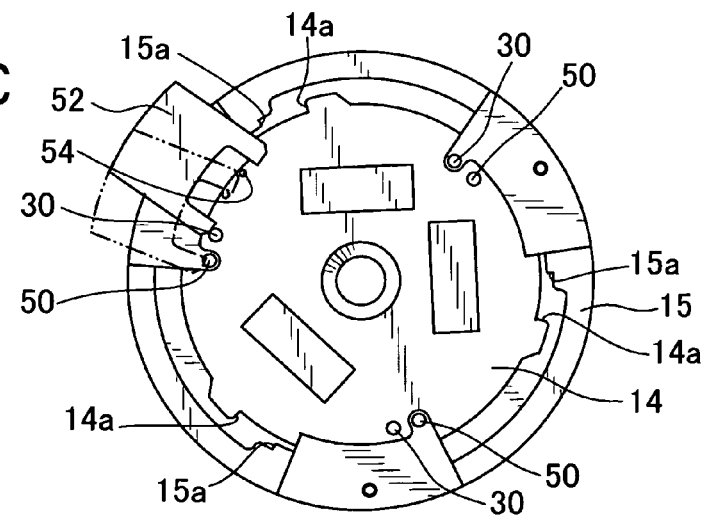
Figure 12:
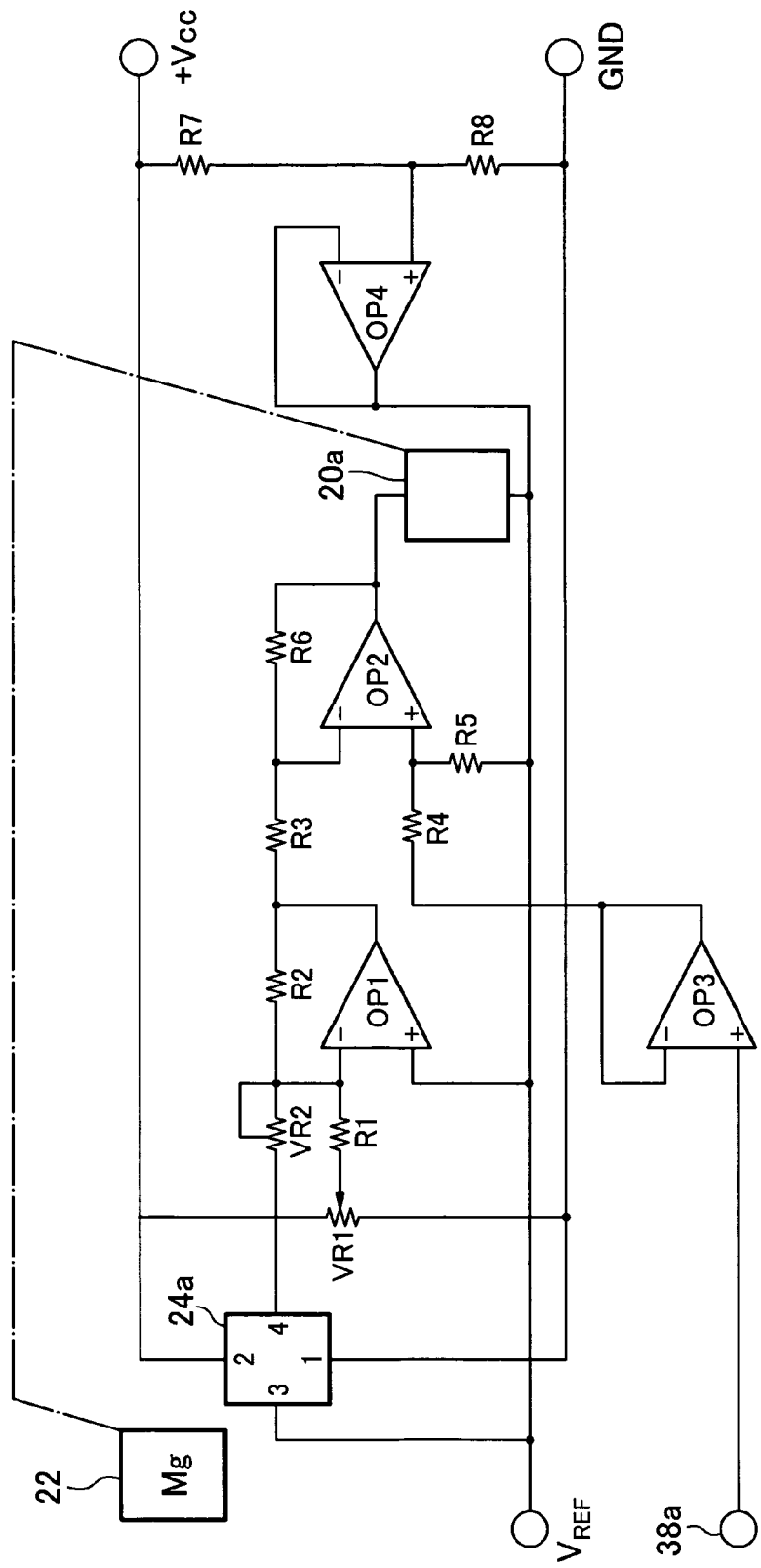
Figure 13:
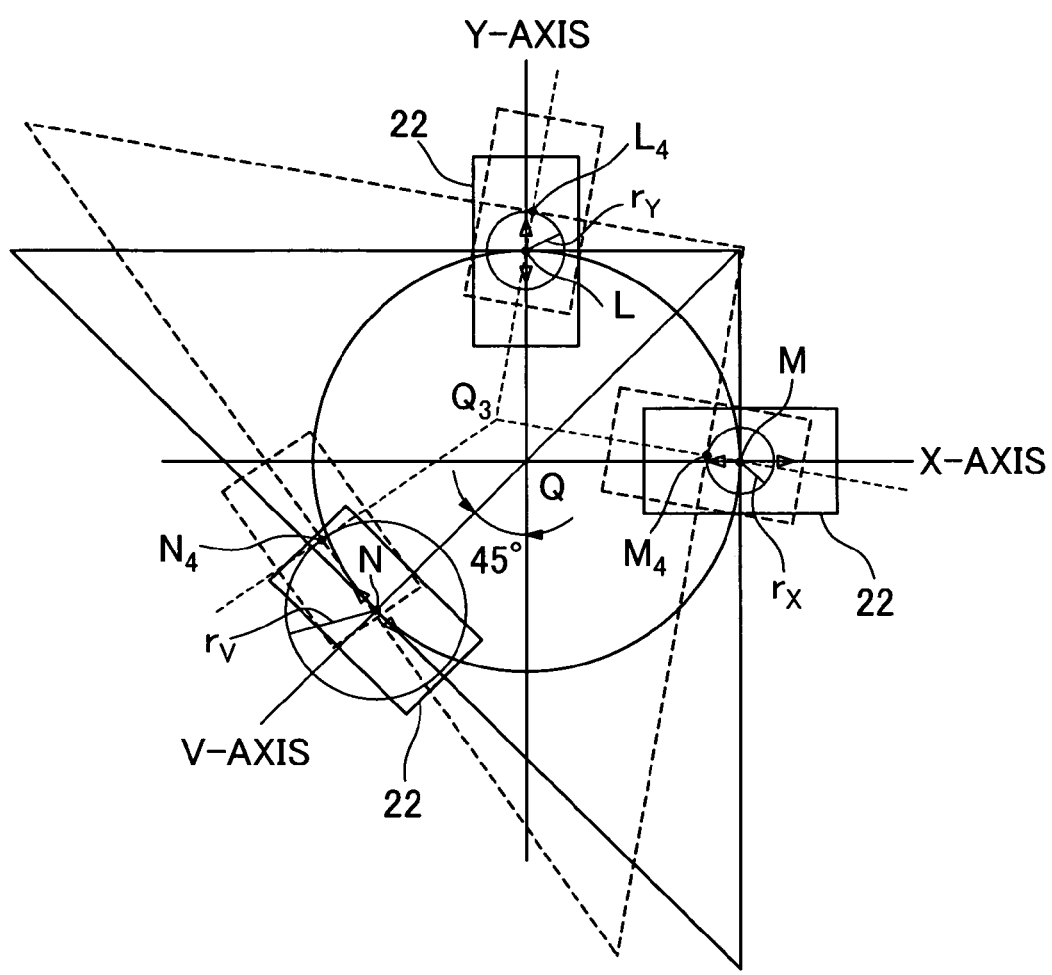

FIGS. 5(a) and 5(b) are partially enlarged top plan view and enlarged frontal view illustrating mutual relations of actuating coils, actuating magnets, back yokes, and attracting yokes;

FIGS. 6 and 7 are diagrams illustrating a relation between the movement of the actuating magnet and the signals generated by the magnetic sensor;

FIG. 8 is a block diagram illustrating the signal process on the controller;

FIG. 9 is a diagram illustrating a positional relation of the actuating coils disposed on the fixed plate and three actuating magnets disposed on the movable frame;

FIG. 10 is a diagram illustrating coil position command signals upon translating and rotating a movable frame;

FIG. 11 is a diagram showing the cases, (a) where the movable frame is locked, (b) the movable frame is transient from the locked condition to the released condition, and (c) where the movable frame is released;

FIG. 12 is an exemplary circuit diagram of a circuit controlling current to flow in the actuating coils; and FIG. 13 depicts a modification of the actuator in the embodiment of the present invention.

DESCRIPTIONS OF THE REFERENCE NUMERALS

1 Camera
2 Lens Unit
4 Camera Body
6 Lens Barrel
8 Photographing Lens
10 Actuator
12 Fixed Plate
14 Movable Frame
14a Engagement Projections (Locking element)
15 Annular Member (Engagement Member)
15a Engagement Projection Contacts
15b Raised Portions
16 Image Stabilizing Lens
18 Steel Ball
20a Actuating Coil
20b Actuating Coil
20c Actuating Coil
22 Actuating Magnets
24a Magnetic Sensor
24b Magnetic Sensor
24c Magnetic Sensor
26 Attracting yokes
28 Back Yokes
30 Attracting Magnets
32 Steel Ball Contacts
34a Gyro
34b Gyro
36 Controller
38a Arithmetic Operation Circuit
38b Arithmetic Operation Circuit
40 Arithmetic Operation Circuit
42a Magnetic Sensor Amplifier
42b Magnetic Sensor Amplifier
42c Magnetic Sensor Amplifier
44a Differential Amplifier
44b Differential Amplifier
44c Differential Amplifier
45 Modified Actuator
46 Annular Member
46a Engagement Elements
50 Fixed Holder Magnets
52 Manual Locking Element
52a U-shaped Dent
54 Engagement Pin

The invention claimed is:
1. An actuator comprising:
a fixed member;
a movable member having a locking element;

movable member supporting means for supporting the movable member so as to permit the movable member to move to an arbitrary position in a plane in parallel with the fixed member;

drive means for translating and rotating the movable member relative to the fixed member, an engagement member engaged with the locking element to lock the movable member when the movable member has been rotated to a predetermined position; and wherein the movable member is shaped approximately as a disk, the locking element is formed with at least three engagement projections extending outwardly in radial directions, and the engagement member is annular in shape, surrounding the outer circumferential surface of the movable member, and is provided with engagement projection contacts protruding inwardly in the radial directions on which the engagement projections fit when the movable member is rotated to the predetermined position.

2. The actuator according to claim 1, further comprising a retaining means for retaining the movable member, and wherein when the movable member is rotated and passes the predetermined position, the retaining means apply rotating force that rotates the movable member in a predetermined direction, thereby the locking element engages with the engagement member to maintain locked condition of the movable member.

3. The actuator according to claim 1, wherein the drive means includes at least three actuating coils attached to either one of the fixed member and the movable member;

actuating magnets attached to the remaining one of the fixed member and the movable member in positions corresponding to the at least three actuating coils;

position sensing means for detecting relative positions of the actuating magnets to the at least three actuating coils; and control means for producing a coil position command signal related to the at least three actuating coils on the basis of a command signal to instruct the position where the movable member is to be moved, and for controlling drive current to flow in the at least three actuating coils in response to the coil position command signal and the position data detected by the position sensing means.

4. The actuator according to claim 2, wherein the retaining means is comprised of a movable holder magnet attached to the movable member, and a fixed holder magnet positioned so as to apply magnetic force urging the movable holder magnet toward predetermined directions when the movable member is rotated to the predetermined position; and when the movable holder magnet and the fixed holder magnet are apart, they do not substantially affect each other, and as the rotation of the movable member brings the movable holder magnet closer to the fixed holder magnet, the magnetic force between them urges the movable member to rotate back, and when the movable member passes a position in which the movable holder magnet is closest to the fixed holder magnet, the magnetic force between them promotes the rotation of the movable member, thereby engaging the locking element with the engagement member.

5. The actuator according to claim 1, further comprising a manual release mechanism, and wherein the manual release mechanism manually rotates the movable member to engage the locking element with the engagement member or to release the engagement of them.

6. A lens unit comprising:

a lens barrel;

a photographing lens housed in the lens barrel;

a fixed member secured to the lens barrel;

a movable member carrying an image stabilizing lens and having a locking element;

movable member supporting means for supporting the movable member so as to permit the movable member to move to an arbitrary position in a plane in parallel with the fixed member;

drive means for translating and rotating the movable member relative to the fixed member;

an engagement member engaged with the locking element to lock the movable member when the movable member has been rotated to a predetermined position;

vibration sensing means for detecting vibrations of the lens barrel;

control means for controlling the drive means to move the movable member in order to stabilize an image on the basis of a detection signal from the vibration sensing means, and then, in response to a locking command signal, controlling the drive means to move the movable member to the position where the movable member is locked; and wherein the movable member is shaped approximately as a disk, the locking element is formed with at least three engagement projections extending outwardly in radial directions, and the engagement member is annular in shape, surrounding the outer circumferential surface of the movable member, and is provided with engagement projection contacts protruding inwardly in the radial directions on which the engagement projections fit when the movable member is rotated to the predetermined position.

7. A camera having a lens unit according to claim 6.

* * * * *